US012638678B2

(12) United States Patent
Nakamura et al.

(10) Patent No.: US 12,638,678 B2
(45) Date of Patent: May 26, 2026

(54) OPTICAL FUNCTIONAL FILM FOR HEAD-UP DISPLAY, OPTICAL LAMINATE, FUNCTIONAL GLASS, AND HEAD-UP DISPLAY SYSTEM

(71) Applicant: NIPPON KAYAKU KABUSHIKI KAISHA, Tokyo (JP)

(72) Inventors: Mitsunori Nakamura, Tokyo (JP);
Chihiro Takahashi, Tokyo (JP);
Tomoyuki Hayasaki, Joetsu (JP);
Yoshihiko Taira, Tokyo (JP);
Yoshiyuki Yahagi, Tokyo (JP)

(73) Assignee: NIPPON KAYAKU KABUSHIKI KAISHA, Tokyo (JP)

( * ) Notice: Subject to any disclaimer, the term of this patent is extended or adjusted under 35 U.S.C. 154(b) by 225 days.

(21) Appl. No.: 18/468,001

(22) Filed: Sep. 15, 2023

(65) Prior Publication Data

US 2024/0004194 A1     Jan. 4, 2024

Related U.S. Application Data

(63) Continuation of application No. PCT/JP2022/011967, filed on Mar. 16, 2022.

(30) Foreign Application Priority Data

Mar. 19, 2021    (JP) ................................. 2021-045431

(51) Int. Cl.
*G02B 27/01*       (2006.01)
*B32B 17/10*       (2006.01)
*B60K 35/23*       (2024.01)

(52) U.S. Cl.
CPC .... *G02B 27/0101* (2013.01); *B32B 17/10036* (2013.01); *B32B 17/10504* (2013.01);
(Continued)

(58) Field of Classification Search
None
See application file for complete search history.

(56) References Cited

U.S. PATENT DOCUMENTS

| | | | |
|---|---|---|---|
| 5,510,913 A | 4/1996 | Hashimoto et al. | |
| 10,241,241 B2 | 3/2019 | Tanaka et al. | |

(Continued)

FOREIGN PATENT DOCUMENTS

| | | |
|---|---|---|
| JP | H06-40271 A | 2/1994 |
| JP | 2002-090743 A | 3/2002 |

(Continued)

OTHER PUBLICATIONS

International Search Report for corresponding International Application No. PCT/JP2022/011967 mailed May 24, 2022.

(Continued)

*Primary Examiner* — Phu Vu
(74) *Attorney, Agent, or Firm* — Chrisman Gallo Tochtrop LLC

(57) ABSTRACT

An optical functional film for a head-up display according to the present disclosure includes (A) two or more phase difference layers and (B) an adhesive layer. The adhesive layer is adjacent to at least one phase difference layer, and an absolute value of difference between a refractive index of the adhesive layer and a refractive index of the phase difference layer adjacent to the adhesive layer in a direction of a fast axis is less than 0.060.

13 Claims, 3 Drawing Sheets

(52) U.S. Cl.
CPC ........ *B32B 17/10761* (2013.01); *B60K 35/23* (2024.01); *B32B 2307/418* (2013.01); *B32B 2307/54* (2013.01); *B32B 2457/20* (2013.01); *G02B 2027/0118* (2013.01)

(56) References Cited

U.S. PATENT DOCUMENTS

| | | | |
|---|---|---|---|
| 2004/0263736 A1 | 12/2004 | Graham et al. | |
| 2005/0078245 A1 | 4/2005 | Sasaki et al. | |
| 2019/0235148 A1* | 8/2019 | Hasegawa | G02B 5/3083 |
| 2019/0235243 A1* | 8/2019 | Anzai | C03C 17/34 |

FOREIGN PATENT DOCUMENTS

| | | |
|---|---|---|
| JP | 2003-315556 A | 11/2003 |
| JP | 2004-029824 A | 1/2004 |
| JP | 5973109 B1 | 8/2016 |
| JP | 2018-017996 A | 2/2018 |
| JP | 2019-152795 A | 9/2019 |
| WO | 2018/084076 A1 | 5/2018 |
| WO | 2020/184714 A1 | 9/2020 |

OTHER PUBLICATIONS

Written Opinion for corresponding International Application No. PCT/JP2022/011967 dated May 24, 2022 and English translation.
International Preliminary Report on Patentability for corresponding International Application No. PCT/JP2022/011967 dated Sep. 12, 2023.
Extended European Search Report dated Feb. 5, 2025 for corresponding European Application No. 22771477.1.
First Office Action in the corresponding JP application No. 2023-507157 Mar. 17, 2026.

* cited by examiner

OPTICAL FUNCTIONAL FILM FOR HEAD-UP DISPLAY, OPTICAL LAMINATE, FUNCTIONAL GLASS, AND HEAD-UP DISPLAY SYSTEM

CROSS REFERENCE TO RELATED APPLICATIONS

This is a continuation application of International Patent Application No. PCT/JP2022/011967 filed Mar. 16, 2022, which claims the benefit of Japanese Patent Application No. 2021-045431 filed Mar. 19, 2021, as well as the full contents of all of which are hereby incorporated by reference in their entirety.

BACKGROUND

Technical Field

The present disclosure relates to, for example, an optical functional film, an optical laminate and functional glass suitable for use for a head-up display, and relates to a head-up display using these.

Description of the Related Art

A navigation system, a head-up display (hereinafter also referred to as a "HUD"), and the like are used as methods for displaying information to drivers of cars and airplanes. A HUD is a system which projects images projected from image projection means such as a liquid crystal display (hereinafter also referred to as an "LCD"), for example, on a windshield of a car or the like.

Emission light emitted from image display units is reflected on a reflecting mirror and further reflected on a windshield, and then reaches an observer. Although the observer sees the image projected on the windshield, it appears as if the image were at an image position beyond the windshield. In this method, since the driver can obtain various pieces of information in a state in which the driver gazes ahead of the windshield almost without moving their sight line, a HUD is safer than conventional car navigation systems, in which drivers had to move their sight lines.

A problem was that, although, in a HUD system, display information was projected while being superimposed on a scene actually seen through a windshield, the display light was reflected on the two surfaces inside and outside the windshield, resulting in the reflected image being a double image, and causing the display information to be difficult to see.

With respect to this problem, it is known that the problem of double-image of the reflected image can be improved using a phase difference element which can change a polarization direction by 90° for the windshield for cars. For example, in Japanese Patent Application Publication No. H06-40271, it is disclosed that when display light converted into S polarized light comes into a windshield for cars including a film-like optical rotator therein at a Brewster angle, some of the S polarized light is reflected on the inner surface of the windshield of a car, S polarized light transmitted through the surface is converted into P polarized light by an optical rotator, and all of the P polarized light is further emitted from the outer surface of the windshield of the car to outside of the car to prevent a double image. However, if the conversion between the S polarized light and the P polarized light is not extremely efficiently performed in such a windshield for cars, or the like, a double image is formed due to the S polarized light being returned without being emitted to outside of the car.

As another means for suppressing the double image, a technique in which a light-controlling film where a circularly polarized light reflecting film produced by using a cholesteric liquid crystal layer is sandwiched by two ¼ wavelength plates is used to make the P polarized light incident is known (Japanese Patent No. 5973109). In this technique, the incident linearly polarized light is converted into circularly polarized light with the ¼ wavelength plate, and the circularly polarized light converted with the light reflecting film produced by using the cholesteric liquid crystal layer is reflected to enable visual confirmation by an observer. However, also by this technique, it is desired that P polarized light incident on the ¼ wavelength plate on the inner side of the car be as efficiently converted into the circularly polarized light as possible, and the circularly polarized light incident on the ¼ wavelength plate on the outside of the car via the cholesteric liquid crystal layer be more efficiently converted into the P polarized light.

SUMMARY

The present disclosure is related to providing an optical functional film, an optical laminate and functional glass for a head-up display having excellent polarization-converting ability within a wide wavelength region, as well as to provide a head-up display system using these.

An optical functional film for a head-up display according to an embodiment of the present disclosure includes (A) two or more phase difference layers and (B) an adhesive layer, wherein the adhesive layer is adjacent to at least one of the phase difference layers, and an absolute value of difference between a refractive index of the adhesive layer and a refractive index of the phase difference layer adjacent to the adhesive layer in a direction of a fast axis is less than 0.060.

In one aspect of the present disclosure, (B) the adhesive layer is provided adjacent to the two phase difference layers, and absolute values of differences between the refractive index of the adhesive layer and refractive indices of the two phase difference layers in the direction of the fast axis are both less than 0.060.

According to one aspect of the present disclosure, in (B) the adhesive layer, difference between an elastic modulus at 25° C. and an elastic modulus at 140° C. is 500 MPa or less.

In one aspect of the present disclosure, at least one of (A) the two or more phase difference layers is a ½ wavelength plate.

In one aspect of the present disclosure, all of (A) the two or more phase difference layers are ½ wavelength plates.

In one aspect of the present disclosure, (B) the adhesive layer is a cured film obtained by curing a curable compound.

In one aspect of the present disclosure, the curable compound is a photocurable compound.

In an optical laminate for a head-up display according to an aspect of the present disclosure, (C) an intermediate film is further laminated on the optical functional film for a head-up display according to the present embodiment.

Functional glass for a head-up display according to an aspect of the present disclosure includes: the optical functional film for a head-up display or optical laminate for a head-up display according to the present embodiment; and (D) a glass plate.

A head-up display system according to an aspect of the present disclosure includes, as a display medium, the optical functional film for a head-up display, the optical laminate for a head-up display, or the functional glass for a head-up display according to the present embodiment.

In one aspect of the present disclosure, light emitted from a display image projection unit comes from a side on which a phase difference layer having a highest refractive index among (A) the two or more phase difference layers is disposed.

In one aspect of the present disclosure, light emitted from a display image projection unit is S polarized light.

According to the present disclosure, an optical functional film, an optical laminate and functional glass for a head-up display having excellent polarization-converting ability within a wide wavelength region, and a head-up display system using these can be achieved.

DETAILED DESCRIPTION

Hereinafter, embodiments according to the present disclosure will be described with reference to the figures. The following embodiments merely illustrate some typical embodiments of the present disclosure, and various modifications can be added within the scope of the present disclosure. Hereinafter, the expression "for a head-up display" may be omitted, and simply referred to as "optical functional film", "optical laminate", and "functional glass". The terms such as "(meth)acryloyl" and "(meth)acrylate" mean "acryloyl" or "methacryloyl" and "acrylate" or "methacrylate", respectively. The term "head-up display" may be expressed as "HUD", and a film used for a phase difference layer may be expressed as "phase difference film".

[Optical Functional Film]

An optical functional film of the present disclosure includes (A) two or more phase difference layers and (B) an adhesive layer, wherein the adhesive layer is adjacent to at least one of the phase difference layers, and an absolute value of difference between a refractive index of the adhesive layer and a refractive index of the phase difference layer adjacent to the adhesive layer in a direction of a fast axis is less than 0.060. According to this, unevenness of double image formation due to a projecting position is eliminated and thereby formation of a double image can be suppressed independently on the projecting position, and thus an optical functional film having excellent polarization-converting ability within a wide wavelength region can be provided.

Figure 1:
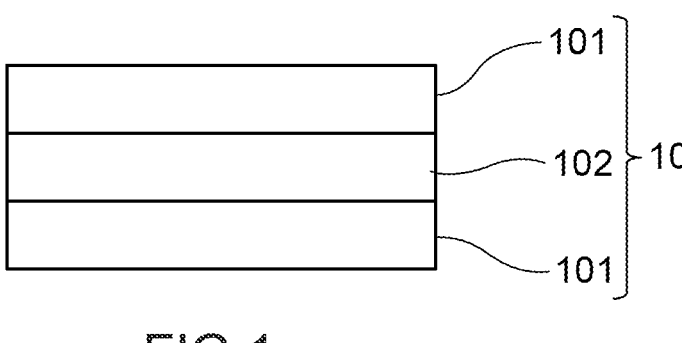
FIG. 1 is a side sectional view showing one embodiment of an optical functional film for a head-up display according to the present disclosure.

FIG. 1 shows one embodiment of the optical functional film of the present disclosure, and on an optical functional film 10, phase difference layers 101 and an adhesive layer 102 are laminated. In FIG. 1, the adhesive layer 102 is provided adjacent to each of the two phase difference layers 101. That is, the two phase difference layers 101 are respectively laminated on both surfaces of the adhesive layer 102. When the adhesive layer 102 and the phase difference layer 101 are laminated, for the phase difference layer 101, a supporting substrate, described later, is preferably provided outside the optical functional film 10, that is, a side not contacting the adhesive layer 102.

<(A) Phase Difference Layer>

The optical functional film of the present disclosure has the two or more phase difference layers, the phase difference layer that each phase difference layer has is a layer having a function of converting the polarization axis of incident light, and the examples include (A-1) a ½ wavelength plate, (A-2) a ¼ wavelength plate, (A-3) a laminate of a ½ wavelength plate and a circularly polarized light reflecting layer, (A-4) a laminate of a ¼ wavelength plate and a circularly polarized light reflecting layer, and (A-5) other layers having any phase difference. The two or more phase difference layers can be used by freely combining the phase difference layers described in the aforementioned (A-1) to (A-5), and these layers may be same as or different from each other, but at least one of the two or more phase difference layers is preferably a ½ wavelength plate, the all are more preferably (A-1) the ½ wavelength plates, and are particularly preferably two ½ wavelength plates. In specific, an aspect where an entirety of (A) the two or more phase difference layers functions as the ½ wavelength plate, or an aspect entirely functioning as the ½ wavelength plate even with combining (A-1) to (A-5) the phase difference layers are preferable. As the circularly polarized light reflecting layer, a cholesteric liquid crystal layer using a cholesteric liquid crystal is preferable, for example. The upper limit of a thickness of the circularly polarized light reflecting layer is preferably 10 μm or less, and more preferably 5 μm or less from the viewpoint of orientation of the liquid crystal. Meanwhile, the lower limit of the thickness of the circularly polarized light reflecting layer is preferably 0.3 μm or more, and more preferably 0.5 μm or more from the viewpoint of polymerizability of the liquid crystal.

<½ Wavelength Plate>

When the ½ wavelength plate is used as the phase difference layer, the ½ wavelength plate is a phase difference element having a function of converting P polarized light into S polarized light or S polarized light into P polarized light, that is, converting a polarization axis. For example, such a ½ wavelength plate can be obtained by monoaxially stretching a film including a polycarbonate or cycloolefin polymer so that phase difference is ½ of a wavelength or by orienting a horizontally oriented polymerizable liquid crystal at a thickness such that the phase difference is ½ of a wavelength. The ½ wavelength plate using a horizontally oriented polymerizable liquid crystal generally includes a polymerizable liquid crystal layer as a layer having the action of converting a polarization axis and a supporting substrate to be coated with a coating liquid which forms the polymerizable liquid crystal layer. Note that, the supporting substrate is not an essential constituting member for the optical functional film of the present disclosure, and the polymerizable liquid crystal layer can be transferred to another substrate material (for example, an intermediate film or a glass plate) to use. By using the ½ wavelength plate, S polarized light or P polarized light that is not reflected on the surface and transmitted is converted into P polarized light or S polarized light, and thereby reflection from the supporting substrate of the ½ wavelength plate disposed on outside of the optical functional film is reduced, and formation of a double image can be suppressed.

The upper limit of the thickness of such a ½ wavelength plate is preferably 10 μm or less, and more preferably 5 μm or less from the viewpoint of the orientation of the liquid crystal. Meanwhile, the lower limit of the thickness of the ½ wavelength plate is preferably 0.3 μm or more, and more preferably 0.5 μm or more from the viewpoint of the polymerizability of the liquid crystal. When light comes into the main surface of the ½ wavelength plate from an oblique position, the phase difference may change depending on the incidence angle of light. In such a case, to adapt the phase difference more strictly, change in the phase difference accompanied with the incidence angle can be suppressed, for example, by using a phase difference element in which the refractive index of the phase difference element is adjusted. For example, when the refractive index in the direction of a slow axis in the surface of the phase difference element is defined as nx, the refractive index in the direction at right angles to the direction of the slow axis in the surface of the phase difference element is defined as ny, and the refractive index in the thickness direction of the phase difference element is defined as nz, the coefficient Nz represented by the following Expression (1) is controlled to preferably 0.3 or more and 1.0 or less, more preferably 0.5 or more and 0.8 or less.

$$Nz = (nx-nz)/(nx-ny) \qquad \text{(1)[Expression 1]}$$

When the ½ wavelength plate includes the polymerizable liquid crystal layer, a liquid crystal composition to constitute the polymerizable liquid crystal layer is applied to the supporting substrate. When the ½ wavelength plate is used for an HUD, it is preferable that such a supporting substrate be transparent in a visible light region to maintain the visibility of a display image. Specifically, the visible light transmittance at a wavelength of 380 nm or more and 780 nm or less may be specifically 50% or more, it is preferable that the visible light transmittance be 70% or more, and it is more preferable that the visible light transmittance be 85% or more. Although the supporting substrate may be colored, it is preferable that the supporting substrate be not or hardly colored. Moreover, it is preferable that the refractive index of the supporting substrate be 1.2 or more and 2.0 or less, and it is more preferable that the refractive index be 1.4 or more and 1.8 or less. The thickness of the supporting substrate may be suitably selected depending on the use, is preferably 5 μm or more and 1000 μm or less, more preferably 10 μm or more and 250 μm or less, and particularly preferably 15 μm or more and 150 μm or less.

The supporting substrate may be a monolayer, or may be a laminate having two layers or more. Example of the supporting substrate include triacetylcellulose (TAC), acryl, polycarbonate, polyvinyl chloride, polyolefin, and polyethylene terephthalate (PET). Among these, triacetylcellulose (TAC), polyolefin, acryl, and the like, which have little birefringence, are preferable.

Next, a method for producing the ½ wavelength plate by using a nematic liquid crystal monomer having the above polymerizable group will be described. As such a method, for example, a nematic liquid crystal monomer having polymerizable groups is dissolved in a solvent, and subsequently the photopolymerization initiator is added. As long as the liquid crystal monomer to be used can be dissolved in such a solvent, such a solvent is not particularly limited. The examples include cyclopentanone, toluene, methyl ethyl ketone and methyl isobutyl ketone, and cyclopentanone, toluene, and the like are preferable. Then, this solution is applied to a plastic substrate, such as a PET film and a TAC film, used as the supporting substrate so that the thickness is as uniform as possible, and the solution is left to stand for a certain period of time under temperature conditions under which the solution becomes a liquid crystal, and is oriented on the supporting substrate while the solvent is removed by heating. At this time, the orientation of the liquid crystal can be more uniform by performing rubbing treatment in a desired orientation direction before applying to the plastic film surface or by performing the orientation treatment such as forming a photo-oriented material (oriented-film coating liquid), which exhibits photo-orientation by polarized light irradiation, into a film on the plastic film substrate surface and then irradiating with polarized light. The slow axes of the ½ wavelength plate can be controlled to desired angles, and the haze values of the ½ wavelength plate can be reduced thereby. Subsequently, the ½ wavelength plate having a desired slow axis can be obtained by irradiating the nematic liquid crystal monomer with ultraviolet rays using a high-pressure mercury lamp or the like while this orientation state is maintained, and fixing the orientation of the liquid crystal.

<¼ Wavelength Plate>

A ¼ wavelength plate can also be used as the phase difference layer. The ¼ wavelength plate is a phase difference element having a function of converting circularly polarized light into linearly polarized light. For example, such a ¼ wavelength plate can be obtained by monoaxially stretching a film including a polycarbonate or cycloolefin polymer so that phase difference is ¼ of a wavelength or by orienting a horizontally oriented polymerizable liquid crystal at a thickness such that the phase difference is ¼ of a wavelength. The ¼ wavelength plate also preferably includes a polymerizable liquid crystal layer, similar to the ½ wavelength plate. In such a case, the ¼ wavelength plate includes the polymerizable liquid crystal layer as a layer having an action of converting the polarization axis, and a supporting substrate on which a coating liquid to form the polymerizable liquid crystal layer is applied. For the polymerizable liquid crystal layer and the supporting substrate, materials same as the nematic liquid crystal monomer and the supporting substrate used for the above ½ wavelength plate can be used. Similarly to the ½ wavelength plate, the supporting substrate is not an essential constituting member for the optical functional film, and the polymerizable liquid crystal layer can be transferred to another substrate material (for example, an intermediate film or a glass plate) to use.

When the deviation of the phase difference due to wavelength dispersion is large as the ¼ wavelength plate, a phase difference element called a broadband ¼ wavelength plate may be used. The broadband ¼ wavelength plate is a phase difference element in which the wavelength dependence of the phase difference is reduced. Examples include a phase difference element in which a ½ wavelength plate and a ¼ wavelength plate having the same wavelength dispersion are laminated so that an angle which the respective slow axes form is 60° and a polycarbonate-based phase difference element in which the wavelength dependence of the phase difference is reduced (manufactured by TEIJIN LIMITED: PURE-ACE WR-S). Moreover, when light comes in at an oblique incidence angle to the ¼ wavelength plate like a HUD, the phase difference may change with the incidence angle of light depending on the phase difference element. In such a case, as a method for matching the phase difference more strictly, for example, a change in the phase difference with the incidence angle can be suppressed by using a phase difference element in which the refractive index of the phase difference element is adjusted. As such an example, when the refractive index in the direction of a slow axis in the surface of the phase difference element is defined as nx, the refractive index in the direction at right angles to the direction of the slow axis in the surface of the phase difference element is defined as ny, and the refractive index in the thickness direction of the phase difference element is defined as nz, the coefficient Nz represented by the Expression (1) is controlled to preferably 0.3 or more and 1.0 or less, more preferably 0.5 or more and 0.8 or less.

The upper limit of the thickness of such a ¼ wavelength plate is preferably 10 μm or less, and more preferably 5 μm or less from the viewpoint of the orientation of the liquid crystal. Meanwhile, the lower limit of the thickness of the ¼ wavelength plate is preferably 0.3 μm or more, and more preferably 0.5 μm or more.

The ½ wavelength plate or the ¼ wavelength plate used as the phase difference layer preferably includes the polymerizable liquid crystal layer containing the polymerizable liquid crystal. The polymerizable liquid crystal is a nematic liquid crystal monomer which has polymerizable groups in a molecule, and exhibits liquid crystallinity in a certain temperature range or a certain concentration range. Examples of the polymerizable groups include a (meth) acryloyl group, a vinyl group, a chalconyl group, a cinnamoyl group, and an epoxy group. In order that the polymerizable liquid crystal exhibits liquid crystallinity, it is preferable that a mesogen group exist in a molecule. The mesogen group means a rod-like or plate-like substituent such as a biphenyl group, a terphenyl group, a (poly)phenyl benzoate ester group, a (poly)ether group, a benzylideneaniline group, or an acenaphthoquinoxaline group; or a disk-like substituent such as a triphenylene group, a phthalocyanine group, or an azacrown group, namely a group having the capability to induce liquid crystal phase behavior. A liquid crystal compound having a rod-like or plate-like substituent is known as a calamitic liquid crystal in the technical field. Examples of the nematic liquid crystal monomer having such polymerizable groups include polymerizable liquid crystals described in Japanese Patent Application Publication No. 2003-315556, Japanese Patent Application Publication No. 2004-29824, and the like; and polymerizable liquid crystals such as the PALIOCOLOR series (produced by BASF SE) and the RMM series (produced by Merck KGaA). The nematic liquid crystal monomers having these polymerizable groups may be used singly or as a mixture of two or more.

A polymerizable compound which can react with a nematic liquid crystal monomer having polymerizable groups and does not have liquid crystallinity can also be added. Examples of such a compound include ultraviolet curable resins. Examples of the ultraviolet curable resins include dipentaerythritol hexa(meth)acrylate, the reaction product of dipentaerythritol penta(meth)acrylate and 1,6-hexamethylene diisocyanate, a reaction product of a triisocyanate having an isocyanuric ring and pentaerythritol tri(meth)acrylate, the reaction product of pentaerythritol tri(meth)acrylate and isophorone diisocyanate, dipentaerythritol penta(meth)acrylate, dipentaerythritol tetra(meth)acrylate, pentaerythritol tetra(meth)acrylate, pentaerythritol tri(meth)acrylate, trimethylolpropane tri(meth)acrylate, ditrimethylolpropane tetra (meth)acrylate, tris(acryloxyethyl) isocyanurate, tris(methacryloxyethyl) isocyanurate, the reaction product of glycerol triglycidyl ether and (meth)acrylic acid, caprolactone-modified tris(acryloxyethyl) isocyanurate, the reaction product of trimethylolpropane triglycidyl ether and (meth)acrylic acid, triglycerol di(meth)acrylate, the reaction product of propylene glycol diglycidyl ether and (meth)acrylic acid, polypropylene glycol di(meth)acrylate, tripropylene glycol di(meth) acrylate, polyethylene glycol di(meth)acrylate, tetraethylene glycol di(meth)acrylate, triethylene glycol di(meth)acrylate, pentaerythritol di(meth)acrylate, the reaction product of 1,6-hexanediol diglycidyl ether and (meth)acrylic acid, 1,6-hexanediol di(meth)acrylate, glycerol di(meth)acrylate, the reaction product of ethylene glycol diglycidyl ether and (meth)acrylic acid, the reaction product of diethylene glycol diglycidyl ether and (meth)acrylic acid, bis(acryloxyethyl) hydroxyethyl isocyanurate, bis(methacryloxyethyl)hydroxyethyl isocyanurate, the reaction product of bisphenol A diglycidyl ether and (meth)acrylic acid, tetrahydrofurfuryl (meth)acrylate, caprolactone-modified tetrahydrofurfuryl (meth)acrylate, 2-hydroxyethyl (meth)acrylate, 2-hydroxypropyl (meth)acrylate, polypropylene glycol (meth)acrylate, polyethylene glycol (meth)acrylate, phenoxyhydroxypropyl (meth)acrylate, acryloylmorpholine, methoxypolyethylene glycol (meth)acrylate, methoxytetraethylene glycol (meth) acrylate, methoxytriethylene glycol (meth)acrylate, methoxyethylene glycol (meth)acrylate, methoxyethyl (meth)acrylate, glycidyl (meth)acrylate, glycerol (meth) acrylate, ethylcarbitol (meth)acrylate, 2-ethoxyethyl (meth) acrylate, N,N-dimethylaminoethyl (meth)acrylate, 2-cyanoethyl (meth)acrylate, the reaction product of butyl glycidyl ether and (meth)acrylic acid, butoxytriethylene glycol (meth)acrylate, and butanediol mono(meth)acrylate. These may be used singly or as a mixture of two or more. These ultraviolet curable resins not having liquid crystallinity have to be added to such an extent that the composition containing a nematic liquid crystal monomer does not lose liquid crystallinity, and the content of the ultraviolet curable resin is preferably 0.1 part by mass or more and 20 parts by mass or less, and more preferably 1.0 parts by mass or more and 10 parts by mass or less based on 100 parts by mass of the nematic liquid crystal monomer having polymerizable groups.

When the nematic liquid crystal monomer having the above-mentioned polymerizable group and the polymerizable compound not having liquid crystallinity are ultraviolet curable, a photopolymerization initiator is added to cure a composition containing these by ultraviolet rays. Examples of the photopolymerization initiator include: acetophenone-based compounds such as 2-methyl-1-[4-(methylthio)phenyl]-2-morpholinopropane-1 (Omnirad® 907, produced by IGM Resins B.V.), 1-hydroxycyclohexyl phenyl ketone (Omnirad® 184, produced by IGM Resins B.V.), 4-(2-hydroxyethoxy)-phenyl (2-hydroxy-2-propyl) ketone (Omnirad® 2959, produced by IGM Resins B.V.), 1-(4-dodecylphenyl)-2-hydroxy-2-methylpropan-1-one (Darocur® 953, produced by Merck KGaA), 1-(4-isopropylphenyl)-2-hydroxy-2-methylpropan-1-one (Darocur® 1116, produced by Merck KGaA), 2-hydroxy-2-methyl-1-phenylpropan-1-one (Omnirad® 1173, produced by IGM Resins B.V.), and diethoxyacetophenone; benzoin-based compounds such as benzoin, benzoin methyl ether, benzoin ethyl ether, benzoin isopropyl ether, benzoin isobutyl ether, and 2,2-dimethoxy-2-phenylacetophenone (Irgacure® 651 produced by BASF SE); benzophenone-based compounds such as benzoylbenzoic acid, methyl benzoylbenzoate, 4-phenylbenzophenone, hydroxybenzophenone, 4-benzoyl-4'-methyldiphenyl sulfide, and 3,3'-dimethyl-4-methoxybenzophenone (KAYACURE® MBP produced by Nippon Kayaku Co., Ltd.); and thioxanthone-based compounds such as thioxanthone, 2-chlorothioxanthone (KAYACURE® CTX produced by Nippon Kayaku Co., Ltd.), 2-methylthioxanthone, 2, 4-dimethylthioxanthone (KAYACURE® RTX, produced by Nippon Kayaku Co., Ltd.), isopropylthioxanthone, 2,4-dichlorothioxanthone (KAYACURE® CTX produced by Nippon Kayaku Co., Ltd.), 2,4-diethylthioxanthone (KAYACURE® DETX produced by Nippon Kayaku Co., Ltd.), and 2,4-diisopropylthioxanthone (KAYACURE® DITX produced by Nippon Kayaku Co., Ltd.). Preferable examples of the photopolymerization initiator include Irgacure® OXE01, Irgacure® OXE02, Irgacure® OXE03, Irgacure® OX E04 (all are produced by BASF SE), Omnirad® TPO H, Omnirad® 1300, Omnirad® 184, Omnirad® 369, Omnirad® 379, Omnirad® 819, Omnirad® 127, Omnirad® 907, and Omnirad® 1173 (all are produced by IGM Resins B.V.), and particularly preferable examples include Omnirad® TPO H, Irgacure® OXE01, Irgacure® OXE02, Omnirad® 1300, and Omnirad® 907. These photopolymerization initiators can be used singly or as a mixture obtained by mixing two or more at any ratio.

When the benzophenone-based compound or the thioxanthone-based compound is used as the photopolymerization initiator, an auxiliary agent can also be used in combination to promote photopolymerization reaction. Example of such an auxiliary agent include amine-based compounds such as triethanolamine, methyldiethanolamine, triisopropanolamine, n-butylamine, N-methyldiethanolamine, diethylaminoethyl methacrylate, Michler's ketone, 4,4'-diethylaminophenone, ethyl 4-dimethylaminobenzoate, (n-butoxy) ethyl 4-dimethylaminobenzoate, and isoamyl 4-dimethylaminobenzoate.

It is preferable that the amounts of the above-mentioned photopolymerization initiator and auxiliary agent added are such that the amounts thereof used do not affect the liquid crystallinity of the liquid crystal composition. The amounts thereof are preferably 0.5 parts by mass or more and 10 parts by mass or less, and more preferably 2 parts by mass or more and 8 parts by mass or less based on 100 parts by mass of the compound cured by ultraviolet rays in the liquid crystal composition. It is preferable that the auxiliary agent be contained within a range of 0.5 times or more and 2 times or less as many as the amount of the photopolymerization initiator.

[(B) Adhesive Layer]

The optical functional film according to the present disclosure includes the adhesive layer adjacent to at least one phase difference layer of (A) the two or more phase difference layers, and an absolute value of difference between a refractive index of this adjacent phase difference layer in the direction of the fast axis and the refractive index of (B) the adhesive layer are less than 0.060. When the adhesive layer is provided adjacent to the two phase difference layers, absolute values of differences between the refractive index of the adhesive layer and refractive indices of the two phase difference layers in the direction of the fast axis are both preferably less than 0.060.

<Refractive Index>

The adhesive layer is adjacent to the phase difference layers. The refractive index of the adhesive layer has to be approximately same as the refractive index of the adjacent phase difference layer in the direction of the fast axis, and specifically, the absolute value of the difference of the refractive index is less than 0.060, preferably less than 0.055, more preferably less than 0.045, and particularly preferably less than 0.040. The refractive index of the adhesive layer and the refractive index of the phase difference layer in the direction of the fast axis can be measured by using a commercially available digital refractometer or the like.

The refractive index of the adhesive layer is preferably 1.400 or more and 1.800 or less. The upper limit of the refractive index of the adhesive layer is preferably 1.750, 1.700, or 1.650 in this order, and particularly preferably 1.600. The lower limit of the refractive index of the adhesive layer is preferably 1.450 or 1.500 in this order, and particularly preferably 1.550. Therefore, the refractive index of the adhesive layer is most preferably 1.550 or more and 1.600 or less. The refractive index of the adhesive layer can be measured with a cured film of an adhesive composition, described later, used for forming the adhesive layer by using a spectrophotometer (for example, UV-3600 manufactured by SHIMADZU CORPORATION). Examples of a method for achieving the above refractive index include selecting an adhesive composition having a refractive index in an uncured state of 1.400 or more and 1.700 or less. The upper limit of the refractive index of the adhesive composition in an uncured state is preferably 1.700, 1.650, 1.600, or 1.550 in this order, and particularly preferably 1.545. The lower limit of the refractive index of the adhesive composition in an uncured state is preferably 1.400, 1.450, or 1.500 in this order, and particularly preferably 1.520. Therefore, the refractive index of the adhesive composition in an uncured state is most preferably 1.520 or more and 1.545 or less.

The refractive index of the phase difference layer adjacent to the adhesive layer in the direction of the fast axis is preferably 1.500 or more and 1.850 or less. The upper limit of the refractive index of the phase difference layer in the direction of the fast axis is preferably 1.800, 1.750, 1.700, or 1.650 in this order, and particularly preferably 1.620. The lower limit of the refractive index of the phase difference layer in the direction of the fast axis is preferably 1.550, 1.560, 1.570, 1.580, or 1.590 in this order, and particularly preferably 1.595. Therefore, the refractive index of the phase difference layer in the direction of the fast axis is most preferably 1.595 or more and 1.620 or less. When the two phase difference layers are adjacent to the adhesive layer, that is, when the two phase difference layers adhere each other via the adhesive layer, the above relationship between the refractive index of the phase difference layer in the direction of the fast axis and the refractive index of the adhesive layer has to be satisfied between both the phase difference layers.

<Average Reflectance>

An average reflectance of the adhesive layer is preferably 5.000% or more and 7.000% or less. The average reflectance can be determined by: producing a cured film by curing an adhesive composition, described later, on a substrate material; then measuring a perpendicular reflectance of the adhesive layer (cured film) with polarized light within a wavelength range of 400 nm or more and 700 nm or less being incident a plurality of times by using a spectrophotometer (for example, UV-3600 manufactured by SHIMADZU CORPORATION); and calculating the average. The upper limit of the average reflectance of the adhesive layer is preferably 6.950%, 6.850%, 6.750%, or 6.650% in this order, and particularly preferably 6.600%. The lower limit of the average reflectance of the adhesive layer is preferably 5.500%, 5.580%, 5.590%, or 5.600% in this order, and particularly preferably 5.700%. Therefore, the average reflectance of the adhesive layer is most preferably 5.700% or more and 6.600% or less.

An average reflectance of the phase difference layer is preferably 5.000% or more and 8.000% or less. The upper limit of the average reflectance of the phase difference layer is preferably 7.500%, 7.000%, or 6.500% in this order, and particularly preferably 6.000%. The lower limit of the average reflectance of the phase difference layer is preferably 5.100% or 5.200% in this order, and particularly preferably 5.300%. Therefore, the average reflectance of the phase difference layer is most preferably 5.300% or more and 6.000% or less.

<Elastic Modulus>

In the adhesive layer, difference between an elastic modulus at room temperature and an elastic modulus at a high temperature is preferably 500 MPa or less. The room temperature is preferably 5° C. or more and 40° C. or less, and more preferably 25° C. The high temperature is preferably 70° C. or more and 200° C. or less, and more preferably 140° C. That is, it is most preferable that difference between an elastic modulus at 25° C. and an elastic modulus at 140° C. be 500 MPa or less. By using an adhesive exhibiting such elastic moduli, a problem of orange peel can be reduced. Here, the orange peel refers to a defect due to roughness on a film, which is also called as citron skin. The conventional optical films as disclosed in Patent Literatures 1 and 2 are likely to cause problems such as moldability failure and interlayer peeling, and when the films are bonded to each other via an adhesive and crimped by glass plates via an intermediate film such as polyvinyl butyral, a plurality of defects called as the orange peel may occur to impair the aesthetic appearance as a windshield glass. By the difference between the elastic modulus at 25° C. and the elastic modulus at 140° C. being 500 MPa or less, occurrence of the orange peel can be suppressed even by crimping the optical functional film of the present disclosure via an intermediate film with glass plates, and windshield glass excellent in aesthetic appearance can be achieved.

The elastic modulus of the adhesive layer can be determined by: producing a cured film by curing an adhesive composition, described later, on a substrate material; and then measuring an elastic modulus of the adhesive layer (cured film) by using a universal tester (for example, TENSILON Universal Tester RTG-1210, manufactured by A&D Company, Limited.). The elastic moduli of the adhesive layer at room temperature and a high temperature are preferably 500 MPa or less, more preferably 350 MPa or less, and further preferably 300 MPa or less. The elastic modulus is measured in accordance with a measuring method of JIS K 7127:1999 (ISO 527-3:2012) by determining strength and elongation when a sample, tensed at a rate of 100 mm/min using a tensile tester, is cut, and measured from a maximum elasticity immediately before deformation of the sample (a linear expression of a tangent of a maximum slope on an S-S curve).

<Curable Compound>

The adhesive layer is preferably a cured film obtained by curing a curable compound. Examples of the curable compound include a thermosetting compound and a photocurable compound, and is preferably a photocurable compound.

<Thermosetting Compound>

Examples of the thermosetting compound include curable compounds having a cyclic ether structure such as an epoxy group and an oxetanyl group. The thermosetting compound having a cyclic ether structure is not particularly limited, and the examples include epoxy resins (aliphatic epoxy resins including alicyclic epoxy resins, or aromatic epoxy resins), oxetane resins, and furan resins. Among these, epoxy resins (which may have an aliphatic ring, for example, an aliphatic ring having 3 to 12 carbon atoms) and oxetane resins are preferable from the viewpoint of the reaction rate and versatility. The epoxy resins are not particularly limited, and the examples include: novolac types, such as a phenol novolac type, a cresol novolac type, a biphenyl novolac type, a trisphenol novolac type, and a dicyclopentadiene novolac type; and bisphenol types, such as a bisphenol A type, a bisphenol F type, a 2,2'-diallylbisphenol A type, a hydrogenated bisphenol type, and a polyoxypropylene bisphenol A type. In addition, the examples also include glycidylamines.

Examples of commercial items of the epoxy resins include, as the phenol novolac epoxy resin, N-740, N-770, and N-775 as EPICLON® series (all are produced by Dainippon Printing Ink Manufacturing Co., Ltd.), and EPIKOTE® 152 and EPIKOTE® 154 (all are produced by Japan Epoxy Resins Co., Ltd.). Examples of the cresol novolac type include, as EPICLON® series, N-660, N-665, N-670, N-673, N-680, N-695, N-665-EXP, and N-672-EXP (all are produced by Dainippon Printing Ink Manufacturing Co., Ltd.); examples of the biphenyl novolac type include NC-3000P (produced by Nippon Kayaku Co., Ltd.); examples of the trisphenol novolac type include EP1032S50 and EP1032H60 (all are produced by Japan Epoxy Resins Co., Ltd.); examples of the dicyclopentadiene novolac type include XD-1000-L (produced by Nippon Kayaku Co., Ltd.) and HP-7200 (produced by Dainippon Printing Ink Manufacturing Co., Ltd.); examples of the bisphenol A type epoxy compound include EPIKOTE® 828, EPIKOTE® 834, EPIKOTE® 1001, and EPIKOTE® 1004 (all are produced by Japan Epoxy Resins Co., Ltd.), and EPICLON® 850, EPICLON® 860, and EPICLON® 4055 (all are produced by Dainippon Printing Ink Manufacturing Co., Ltd.); examples of commercial items of the bisphenol F type epoxy compound include EPIKOTE® 807 (produced by Japan Epoxy Resins Co., Ltd.) and EPICLON® 830 (produced by Dainippon Printing Ink Manufacturing Co., Ltd.); examples of the 2,2'-diallylbisphenol A type include RE-810NM (produced by Nippon Kayaku Co., Ltd.); examples of the hydrogenated bisphenol type include ST-5080 (produced by Tohto Kasei Co., Ltd.); and examples of the polyoxypropylene bisphenol A type include EP-4000 and EP-4005 (all are produced by ASAHI DENKA CO., LTD.). The alicyclic epoxy resin is not particularly limited, and the examples include CELLOXIDE® 2021, CELLOXIDE® 2080, and CELLOXIDE® 3000 (all the above are produced by Daicel-UCB Company, Ltd.).

Examples of commercial items of the oxetane resin include ETERNACOLL® EHO, ETERNACOLL® OXBP, ETERNACOLL® OXTP, and ETERNACOLL® OXMA (all are produced by UBE Corporation). These curable compounds having a cyclic ether group may be used singly or in combination of two or more.

<Photocurable Compound>

Examples of the photocurable compound include a resin having a vinyl group, a vinyl ether group, an allyl group, a maleimide group, a (meth)acryloyl group, or the like. Among these, a resin having a (meth)acryloyl group, for example, a (meth)acrylate compound, is preferable from the viewpoint of the reactivity and versatility.

Examples of the resin having (meth)acryloyl groups include (meth)acrylate compounds such as 2-hydroxyethyl (meth)acrylate, 2-hydroxypropyl (meth)acrylate, 1,4-butanediol mono(meth)acrylate, Carbitol (meth)acrylate, acryloyl morpholine, a half ester which is a reaction product of hydroxyl group-containing (meth)acrylate and an acid anhydride of a polycarboxylic acid compound, polyethylene glycol di(meth)acrylate, tripropylene glycol di(meth)acrylate, trimethylolpropane tri(meth)acrylate, trimethylolpropanepolyethoxy tri(meth)acrylate, glycerin polypropoxy tri (meth)acrylate, a di(meth)acrylate of an s-caprolactone adduct of neopentyl glycol hydroxypivalate, (for example, produced by Nippon Kayaku Co., Ltd., and HX-220, HX-620, or the like of KAYARAD® series), pentaerythritol tetra(meth)acrylate, a poly(meth)acrylate of a reaction product of dipentaerythritol and s-caprolactone, dipentaerythritol poly(meth)acrylate (for example, produced by Nippon Kayaku Co., Ltd., KAYARAD® DPHA, or the like), and an epoxy (meth)acrylate which is a reaction product of a mono- or polyglycidyl compound and (meth)acrylic acid.

The glycidyl compound used for the epoxy (meth)acrylate which is a reaction product of a mono- or polyglycidyl compound and (meth)acrylic acid is not particularly limited. Examples include bisphenol A, bisphenol F, bisphenol S, 4,4'-biphenylphenol, tetramethylbisphenol A, dimethylbisphenol A, tetramethylbisphenol F, dimethylbisphenol F, tetramethylbisphenol S, dimethylbisphenol S, tetramethyl-4,4'-biphenol, dimethyl-4,4'-biphenyl phenol, 1-(4-hydroxy-phenyl)-2-[4-(1,1-bis-(4-hydroxyphenyl)ethyl) phenyl]pro-pane, 2,2'-methylene-bis(4-methyl 6-tert-butylphenol), 4,4'-butylidene-bis(3-methyl 6-tert-butylphenol), tris (hydroxyphenyl)methane, resorcinol, hydroquinone, pyrogallol, and phenols having diisopropylidene skeletons; phenols such as 1,1-di-4-hydroxyphenylfluorene having fluorene skeletons; glycidyl etherified products of polyphenols such as phenolated polybutadiene, brominated bisphenol A, brominated bisphenol F, brominated bisphenol S, brominated phenol novolac, brominated cresol novolac, chlorinated bisphenol S, and chlorinated bisphenol A.

These epoxy (meth)acrylates which are reaction products of mono- or polyglycidyl compounds and (meth)acrylic acid can be obtained by subjecting epoxy groups thereof and equivalent amounts of (meth)acrylic acid to esterification reaction. This synthetic reaction can be performed by a commonly known method. For example, to resorcin diglycidyl ether is added (meth)acrylic acid in an amount equivalent thereto with a catalyst (for example, benzyldimethyl-amine, triethylamine, benzyltrimethylammonium chloride, triphenylphosphine, triphenylstibine, or the like) and a polymerization inhibitor (for example, methoquinone, hydroquinone, methylhydroquinone, phenothiazine, dibutylhydroxytoluene, or the like), and esterification reaction is performed at 80 to 110° C. The thus obtained (meth) acrylated resorcin diglycidyl ether is a resin having radical polymerizable (meth)acryloyl groups.

The curable compound is preferably a thermosetting resin or a photocurable resin, more preferably a photocurable resin, and particularly preferably a photocurable resin having three or more (meth)acryloyl groups in a molecule. Examples of the photocurable resin having three or more (meth)acryloyl groups and a polar functional group in a molecule include: (meth)acrylate monomer compounds such as pentaerythritol triacrylate (for example, KAYARAD® PET-30, produced by Nippon Kayaku Co., Ltd.), a mixture of dipentaerythritol pentaacrylate and dipentaerythritol hex aacrylate (for example, KAYARAD® DPHA, produced by Nippon Kayaku Co., Ltd.), 2-hydroxy-3-acryloyloxypropyl methacrylate (for example, 701A, produced by SHIN-NA-KAMURA CHEMICAL Co., Ltd.), ethoxylated isocyanuric acid triacrylate (for example, A-9300, produced by SHIN-NAKAMURA CHEMICAL Co., Ltd.), and ε-caprolactone-modified tris(2-acryloxyethyl) isocyanurate (for example, A-9300-1CL, produced by SHIN-NAKAMURA CHEMI-CAL Co., Ltd.); epoxy acrylate resins such as bisphenol A type epoxy acrylates (for example, R-115F, R-130, R-381, and the like, produced by Nippon Kayaku Co., Ltd.), bisphenol F type epoxy acrylates (for example, ZFA-266H, produced by Nippon Kayaku Co., Ltd.), and acid-modified epoxy acrylates (for example, the ZAR series and the ZCR series, produced by Nippon Kayaku Co., Ltd.); and urethane acrylate resins such as polyester-based urethane acrylates (for example, UX3204, UX-4101, and UXT-6100, produced by Nippon Kayaku Co., Ltd.), mixed urethane acrylates (for example, UX-6101 and UX-8101, produced by Nippon Kayaku Co., Ltd.), polyether-based urethane acrylates (UX-937 and UXF-4001-M35, produced by Nippon Kayaku Co., Ltd.), and ester-based urethane acrylates (for example, DPHA-40H, UX-5000, UX-5102D-M20, UX-5103D, and UX-5005, produced by Nippon Kayaku Co., Ltd.). The photocurable resin having three or more (meth)acryloyl groups in a molecule more preferably has three or more and ten or less (meth)acryloyl groups, and further preferably has four or more and eight or less (meth)acryloyl groups.

The content of the curable compound is preferably 0.5 mass % or more and 90 mass % or less, and more preferably 5 mass % or more and 70 mass % or less based on the total mass of the adhesive layer.

<Curing Agent>

The curable compound used for the adhesive layer is preferably cured by using a curing agent. The curing agent and the curing initiator may be distinguished, but both of them are described as the curing agent herein.

When the thermosetting compound is used as the curable compound, a thermosetting agent is preferably used in combination. When the thermosetting compound is a thermosetting compound having a cyclic ether, a photo-cation initiator and a photo-anion initiator, which generates a cation or an anion with light, can also be preferably used.

As the thermosetting agent, a nucleophilically reacted compound due to a lone-pair electron or an anion in a molecule is used. Examples of such a thermosetting agent include amine-based curing agents (hereinafter, referred to amines), hydrazide-based curing agents (hereinafter, referred to as hydrazides), imidazole-based curing agents (hereinafter, referred to as imidazoles), polyamide resins, dicyan diamides, isocyanates, thiol-based curing agents (hereinafter, referred to as thiols), and phenol-based curing agents (phenols), but are not limited thereto.

Examples of the amines include aliphatic chain amines, aliphatic cyclic amines, aromatic amines, and modified amines (such as amine adducts and ketimines). The amines may be any of primary amines, secondary amines, tertiary amines, and quaternary amines, but are preferably primary amines or secondary amines in terms of the reactivity. Specific examples of the amines include: aromatic amines such as diaminodiphenylmethane, diaminodiphenyl sulfone, 4,4'-diamino-3,3'-dimethyldiphenylmethane, diaminodiphenyl ether, diethylmethylbenzenediamine, 2-methyl-4,6-bis (methylthio)-1,3-benzenediamine, bisaniline, diethyltolu-enediamine, diethylthiotoluenediamine, and N,N'-bis(sec-butylamino)diphenylmethane; aliphatic amines such as methylamine, dimethylamine, trimethylamine, ethylamine, diethylamine, triethylamine, ethylenediamine, tetramethyl-ethylenediamine, hexamethylenediamine, norbornanedi-amine, polyetheramine, triethylenetetramine, and tetraethyl-enepentamine; and modified amines. Among these, diethylmethylbenzenediamine, 4,4'-diamino-3,3'-dimethyl-diphenylmethane, and diethyltoluenediamine are preferable.

As the hydrazides, organic acid hydrazide compounds are particularly preferably used. Examples of the organic acid hydrazides include aromatic hydrazides such as salicylic hydrazide, terephthalic dihydrazide, isophthalic dihydraz-ide, 2,6-naphthoic dihydrazide, 2,6-pyridine dihydrazide, 1,2,4-benzene trihydrazide, 1,4,5,8-naphthoic tetrahydraz-ide, and pyromellitic tetrahydrazide. Examples of the ali-phatic hydrazides include formhydrazide, acetohydrazide, propionic hydrazide, oxalic dihydrazide, malonic dihydrazide, succinic dihydrazide, glutaric dihydrazide, adipic dihydrazide, pimelic dihydrazide, sebacic dihydrazide, 1,4-cyclohexane dihydrazide, tartaric dihydrazide, malic dihydrazide, iminodiacetic dihydrazide, N,N'-hexamethylene bis semicarbazide, citric trihydrazide, nitrilotriacetic trihydrazide, cyclohexanetricarboxylic trihydrazide, dihydrazide compounds having a hydantoin skeleton, preferably a valine hydantoin skeleton (a skeleton in which a carbon atom in a hydantoin ring is substituted with an isopropyl group) such as 1,3-bis(hydrazinocarbonoethyl)-5-isopropylhydantoin, tris(1-hydrazinoc arbonylmethyl) isocyanurate, tris (2-hydrazinocarbonylethyl) isocyanurate, tris(1-hydrazinocarbonylethyl) isocyanurate, tris (3-hydrazinocarbonylpropyl) isocyanurate, and bis(2-hydrazinocarbonylethyl) isocyanurate. Among these, isophthalic dihydrazide, malonic dihydrazide, adipic dihydrazide, tris(hydrazinocarbonylmethyl) isocyanurate, tris(1-hydrazinocarbonylethyl) isocyanurate, tris(2-hydrazinocarbonylethyl) isocyanurate, and tris(3-hydrazinocarbonylpropyl) isocyanurate are preferable, and tris(2-hydrazinocarbonylethyl) isocyanurate is particularly preferable from the viewpoint of the curing reactivity and latency.

Examples of the imidazoles include: imidazoles such as 2-methylimidazole, 2-phenylimidazole, 2-undecylimidazole, 2-heptadecylimidazole, 2-phenyl-4-methylimidazole, 1-benzyl-2-phenylimidazole, 1-benzyl-2-methylimidazole, 1-cyanoethyl-2-methylimidazole, 1-cyanoethyl-2-phenylimidazole, 1-cyanoethyl-2-undecylimidazole, 2,4-diamino-6-(2'-methylimidazole(1'))ethyl-s-triazine, 2,4-diamino-6-(2'-undecylimidazole(1'))ethyl-s-triazine, 2,4-diamino-6-(2'-ethyl-4-methylimidazole(1'))ethyl-s-triazine, 2,4-diamino-6-(2'-methylimidazole(1'))ethyl-s-triazine isocyanuric acid adduct, an adduct of 2-methylimidazole isocyanuric acid at 2:3, 2-phenylimidazole isocyanuric acid adduct, 2-phenyl-3,5-dihydroxymethylimidazole, 2-phenyl-4-hydroxymethyl-5-methylimidazole, and 1-cyanoethyl-2-phenyl-3,5-dicyanoethoxymethylimidazole; and salts of these imidazoles and polycarboxylic acids, such as phthalic acid, isophthalic acid, terephthalic acid, trimellitic acid, pyromellitic acid, naphthalenedicarboxylic acid, maleic acid, and oxalic acid.

Examples of the thiols include, as the Karenz® series, PE1, BD1, and NR1 (all are produced by Showa Denko K.K.), trimethylolpropane tris(3-mercaptobutyrate), and trimethylolethane tris(3-mercaptobutyrate). The thiol-type curing agent is a curing agent having at least one thiol group (SH) in a molecule.

Examples of the phenols include phenol novolac obtained by condensation reaction of formalin to phenol (which may have sub stituents) in the presence of an acid catalyst, bisphenol A, and bisphenol S.

When the thermosetting agent is used, a curing accelerator may be used in combination. Examples of the curing accelerator include phenols, organic acids, phosphines, and imidazoles. The curing accelerator includes a compound having a function as the thermosetting agent.

Examples of the phenols include phenol novolac obtained by condensation reaction of formalin to phenol (which may have substituents) in the presence of an acid catalyst, bisphenol A, and bisphenol S.

Examples of the organic acids include organic carboxylic acids and organic phosphoric acids, and the organic acid is preferably an organic carboxylic acid. Specific examples of the organic carboxylic acid include: aromatic carboxylic acids such as phthalic acid, isophthalic acid, terephthalic acid, trimellitic acid, benzophenonetetracarboxylic acid, and furandicarboxylic acid; succinic acid, adipic acid, dodecanedioic acid, sebacic acid, thiodipropionic acid, cyclohexanedicarboxylic acid, tris(2-carboxymethyl) isocyanurate, tris(2-carboxyethyl) isocyanurate, tris(2-carboxypropyl) isocyanurate, and bis(2-carboxyethyl) isocyanurate.

Examples of the phosphines include triphenylphosphine and tetraphenylphosphonium tetraphenylborate.

Examples of the imidazoles include 2-methylimidazole, 2-phenylimidazole, 2-undecylimidazole, 2-heptadecylimidazole, 2-phenyl-4-methylimidazole, 1-benzyl-2-phenylimidazole, 1-benzyl-2-methylimidazole, 1-cyanoethyl-2-methylimidazole, 1-cyanoethyl-2-phenylimidazole, 1-cyanoethyl-2-undecylimidazole, 2,4-diamino-6-(2'-methylimidazole(1'))ethyl-s-triazine, 2,4-diamino-6-(2'-undecylimidazole(1'))ethyl-s-triazine, 2,4-diamino-6-(2'-ethyl-4-methylimidazole(1'))ethyl-s-triazine, 2,4-diamino-6-(2'-methylimidazole(1'))ethyl-s-triazine isocyanuric acid adduct, an adduct of 2-methylimidazol isocyanuric acid at 2:3, 2-phenylimidazole isocyanuric acid adduct, 2-phenyl-3,5-dihydroxymethylimidazole, 2-phenyl-4-hydroxymethyl-5-methylimidazole, and 1-cyanoethyl-2-phenyl-3,5-dicyanoethoxymethylimidazole.

<Photo-Initiator>

When the photocurable compound is used as the curable compound, a photo-initiator is preferably used in combination. Since the photocurable compound has a functional group that causes a chain polymerization reaction with radicals, such as a double bond, use of a heat radical initiator to generate radicals with heat is not excluded, for example.

The photo-initiator is preferably a photo-radical polymerization initiator. As long as the photo-radical polymerization initiator is a compound which produces radicals by irradiating with ultraviolet rays or visible light, and starts a chain polymerization reaction, the photo-radical polymerization initiator is not particularly limited. The examples include benzyl dimethyl ketal, 1-hydroxycyclohexyl phenyl ketone, diethylthioxanthone, benzophenone, 2-ethylanthraquinone, 2-hydroxy-2-methylpropiophenone, 2-methyl-[4-(methylthio)phenyl]-2-morpholino-1-propane, 2,4,6-trimethylbenzoyldiphenylphosphine oxide, camphorquinone, 9-fluorenone, and diphenyl disulfide. Examples of commercial items include, as the IRGACURE® series, 651, 184, 2959, 127, 907, 369, 379EG, 819, 784, 754, 500, OXE01, and OXE02, DAROCUR® 1173, Lucirin® TPO (all are produced by BASF SE), and as the SEIKUOL® series, Z, BZ, BEE, BIP, and BBI (all are produced by Seiko Chemical Co., Ltd.).

A molar absorption coefficient ($\epsilon$) at 365 nm of the photo-radical polymerization initiator is preferably 50 mL/g·cm or more and 10000 mL/g·cm or less, more preferably 100 mL/g·cm or more and 8000 mL/g·cm or less, and further preferably 1000 mL/g·cm or more and 7500 mL/g·cm or less. The molar absorption coefficient is measured in methanol or acetonitrile as a solvent. Among these, examples of the photo-radical polymerization initiator having a molar absorption coefficient ($\epsilon$) at 365 nm of 100 mL/g·cm or more and 10000 mL/g·cm or less include, but not limited to, Omnirad® 651 ($\epsilon$=360 mL/g·cm in methanol), Omnirad® 907 ($\epsilon$=4700 mL/g·cm in methanol), Omnirad® 369 ($\epsilon$=7900 mL/g·cm in methanol), Omnirad® 379 ($\epsilon$=7900 mL/g·cm in methanol), Omnirad® 819 ($\epsilon$=2300 mL/g·cm in methanol), Omnirad® TPO ($\epsilon$=4700 mL/g·cm in acetonitrile), IRGACURE® OXE-01 ($\epsilon$=7000 mL/g·cm in acetonitrile), and IRGACURE® OXE-θ2 ($\epsilon$=7700 mL/g·cm in acetonitrile).

When the photo-radical polymerization initiator is used, it is preferable that the content thereof be 0.01 part by mass or more and 10 parts by mass or less based on the total amount of 100 parts by mass of the binder resin. The upper limit of the content thereof is more preferably 7 parts by mass, further preferably 5 parts by mass, particularly preferably 4 parts by mass, and most preferably 3 parts by mass. The lower limit of the content thereof is more preferably 0.05 parts by mass, further preferably 0.1 part by mass, particularly preferably 1 part by mass, and most preferably 1.5 parts by mass.

<Heat Radical Polymerization Initiator>

When a heat radical polymerization initiator is used for the photocurable compound, as long as the heat radical polymerization initiator is a compound which produces radicals by heating, and starts a chain polymerization reaction, the heat radical polymerization initiator is not particularly limited. The examples include organic peroxides, azo compounds, benzoin compounds, benzoin ether compounds, acetophenone compounds, and benzopinacol, and benzopinacol are suitably used. As the organic peroxides, for example, as the Kayamek® series, A, M, R, L, LH, and SP-30C; as the Perkadox® series, CH-50L, BC-FF, L-40ES (Cadox B-40ES), 14, 16; as the Trigonox® series, 22-70E, 23-C70, 121, 121-50E, 121-LS50E, 21-LS50E, 42, and 42LS; as the Kayaester® series, P-70, TMPO-70, CND-C70, 00-50E, and AN; as the Kayabutyl® series, B; as the Kayacarbon® series, BIC-75 and AIC-75 (produced by Kayaku Akzo Corporation); as the PERMEK® series, N, H, S, F, D, and G; as the PERHEXA® series, H, HC, TMH, C, V, 22, and MC; as the PERCURE® series, AH, AL, and HB; as the PERBUTYL® series, H, C, ND, and L; as the PERCUMYL® series, H and D; as the PEROYL® series, IB and IPP; PEROCTA® ND (produced by NOF CORPORATION); and the like are available as commercial items. As the azo compounds, VA-044, V-070, VPE-0201, VSP-1001 (produced by FUJIFILM Wako Pure Chemical Corporation), and the like are available as commercial items.

When the heat radical polymerization initiator is used, the content thereof is preferably 0.01 part by mass or more and 10 parts by mass or less based on 100 parts by mass of the total amount of the binder resin. The upper limit of the content thereof is more preferably 7 parts by mass, further preferably 5 parts by mass, particularly preferably 4 parts by mass, and most preferably 3 parts by mass. The lower limit of the content thereof is more preferably 0.05 parts by mass, further preferably 0.1 part by mass, particularly preferably 1 part by mass, and most preferably 1.5 parts by mass. Therefore, the most preferable range of the content in the adhesive layer is 1.5 parts by mass or more and 3 parts by mass or less.

[Optical Laminate]

In the optical laminate of the present disclosure, (c) the intermediate film is further laminated onto the above-mentioned optical functional film. It is preferable that the intermediate film be a resin film of a thermoplastic resin, and it is particularly preferable that the intermediate film be a film of polyvinyl butyral. Although the number of the intermediate film may be one or more, an optical laminate having a structure in which the optical film was sandwiched by two intermediate films is preferable.

Figure 2:
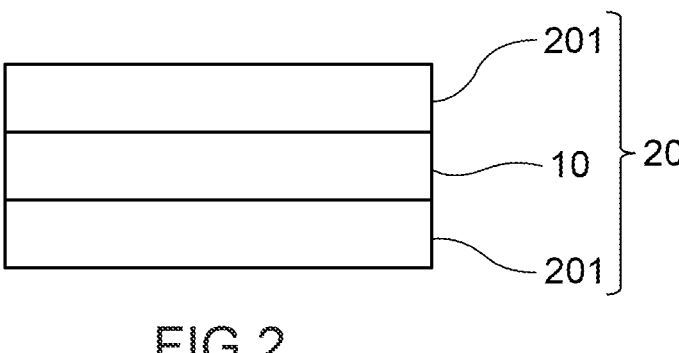
FIG. 2 is a side sectional view showing one embodiment of an optical laminate for a head-up display according to the present disclosure.

FIG. 2 shows one embodiment of the optical laminate of the present disclosure. The optical laminate 20 has a structure in which the optical functional film 10 is sandwiched by two intermediate films 201, and the optical functional film 10 corresponds to the optical functional film in FIG. 1, for example. Such an optical laminate 20 is produced by laminating the intermediate films 201 and the optical functional film 10.

<(c) Intermediate Film>

As the intermediate film, a thermoplastic resin can be used. It is preferable that a commonly used intermediate film for automotive application can be used. Examples of such the intermediate film for automotive application include polyvinyl butyral-based resins (PVB s), polyvinyl alcohol resins (PVAs), ethylene-vinyl acetate copolymer-based resin (EVAs), or cycloolefin polymers (COPs). Intermediate films manufactured from these resins are preferable due to being versatile as intermediate films for laminated glass. As long as the reflection of display light is not affected at the time of applying the optical laminate to the HUD system described below, the thickness of the intermediate film is not particularly limited, and can be suitably designed depending on the use.

An ultraviolet ray absorbent, an antioxidant, an antistatic agent, a heat stabilizer, a coloring agent, an adhesion control agent, and the like may be optionally added to the intermediate film used in the present disclosure, especially the intermediate film in which particulates which absorb infrared rays are dispersed is important for manufacturing heat shielding laminated glass with high performance. Particulates of materials such as metals selected from the group consisting of Sn, Ti, Zn, Fe, Al, Co, Ce, Cs, In, Ni, Ag, Cu, Pt, Mn, Ta, W, V, and Mo, oxides of the metals, nitrides of the metals, or complexes containing at least two or more thereof, which have conductivity, are used for particulates which absorb infrared rays. These materials may be doped with Sn, Sb, F, or the like. When heat shielding laminated glass is used as windows for construction or cars required for transparency, especially tin-doped indium oxide (ITO), anti-mony-doped tin oxide (ATO), and fluorine-doped tin oxide, which are transparent in the visible light region, are preferable. It is preferable that the particle size of the particulates which absorb infrared rays and are dispersed in the intermediate film be 0.2 μm or less. If the particle size of the particulates is 0.2 μm or less, infrared rays can be absorbed while the scattering of light in the visible light region is suppressed, the physical properties such as adhesiveness, transparency, and durability are maintained equivalently to an unadded intermediate film without causing haze while the radio wave transmittance and the transparency are secured, and treatment for forming laminated glass can moreover be performed in operation in a common line for manufacturing laminated glass. When PVB is used for the intermediate film, lamination treatment is performed in a room at constant temperature and constant humidity to maintain the moisture content of the intermediate film optimally. An intermediate film, a part of which is colored, an intermediate film in which a layer having a sound insulation function is sandwiched, an intermediate film in which the thickness is oblique (wedge shape) to reduce a ghost phenomenon (double reflection) in the HUD, or the like can be used for the intermediate film.

Although the method for laminating the intermediate film and the optical functional film is not particularly limited, the examples include a method for laminating the intermediate film with the optical functional film by press-fitting simultaneously using a nip roll. When the nip roll can be heated at the time of lamination, the intermediate film and the optical functional film can also be press-fit during heating. When the adhesion between the intermediate film and the optical functional film is inferior, the lamination may be performed after surface treatment by corona treatment, plasma treatment, or the like is performed beforehand.

The intermediate film may be directly laminated on one surface or both surfaces of the optical functional film with the intermediate film dissolved in a solvent. When a polyvinyl butyral-based resin (PVB) is used, it is preferable that the lower limit of the degree of butyralation be 40% by mol, it is more preferable that the lower limit be 55% by mol, and it is particularly preferable that the lower limit be 60% by mol. Meanwhile, it is preferable that the upper limit of the degree of butyralation be 85% by mol, it is more preferable that the upper limit be 80% by mol, and it is particularly preferable that the upper limit be 75% by mol. The degree of butyralation can be measured by an infrared absorption spectrum (IR) method, and for example, can be measured using an FT-IR.

It is preferable that the lower limit of the amount of the hydroxyl groups of the polyvinyl butyral-based resin be 15% by mol, and it is preferable that the upper limit be 35% by mol. When the amount of the hydroxyl groups is less than 15% by mol, the adhesiveness between the intermediate film for laminated glass and a glass plate may decrease, or the penetration resistance of the laminated glass may decrease. Meanwhile, when the amount of hydroxyl groups exceeds 35% by mol, the intermediate film may be hard.

The polyvinyl butyral-based resin can be prepared by acetalizing polyvinyl alcohol with an aldehyde. Polyvinyl alcohol is usually obtained by saponifying polyvinyl acetate, and polyvinyl alcohol having a saponification degree of 80% by mol or more and 99.8% by mol or less is generally used. It is preferable that the upper limit of the polymerization degree of polyvinyl alcohol be 4000, it is more preferable that the upper limit be 3000, and it is particularly preferable that the upper limit be 2500. When the polymerization degree exceeds 4000, the manufacturing of the intermediate film may be difficult.

<Functional Glass>

The functional glass of the present disclosure includes the optical functional film or optical laminate and (D) a glass plate. Although the glass plate may be one or more, functional glass having a structure in which the optical functional film or optical laminate is sandwiched by two glass plates is preferable. Such functional glass is suitably used as a display medium in the HUD system.

Figure 3:
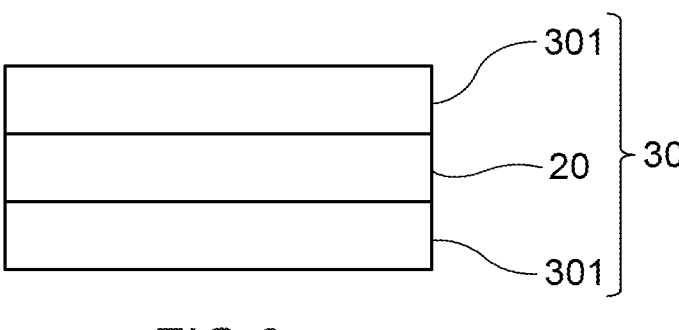
FIG. 3 is a side sectional view showing one embodiment of functional glass for a head-up display according to the present disclosure.

When the functional glass is produced by using the optical functional film or optical laminate of the present disclosure, the functional glass in which the optical laminate is disposed in the laminated glass can be obtained by disposing the optical functional film or the optical laminate between the two glass plates and press-fitting at high temperature and high pressure. FIG. 3 shows one embodiment of the functional glass according to the present disclosure. Functional glass 30 shown in FIG. 3 has a structure in which an optical laminate 20 are sandwiched by two glass plates 301, and in the optical laminate 20, the optical film 10 is sandwiched by two intermediate films 102. As shown in FIG. 3, when a glass plate 301 is laminated on the optical laminate 20, the intermediate film 201 also has a function as a pressure sensitive adhesive or an adhesive for retaining adhesiveness between the two glass plates 301 and the optical laminate 20.

<(D) Glass Plate>

The functional glass is manufactured, for example, by bonding the above-mentioned optical functional film or optical laminate onto the glass plate. As one example of the method for bonding an optical functional film or an optical laminate onto a glass plate, the functional glass can be obtained by applying a pressure sensitive adhesive or an adhesive to one side or both sides of the optical functional film or the optical laminate and subsequently bonding the glass plate. Although the pressure sensitive adhesive or the adhesive is not particularly limited, when the removal may be performed later, a material which is excellent in reworkability, and has good adhesiveness, for example, a silicone pressure sensitive adhesive, an acrylic pressure sensitive adhesive, or the like, is preferable.

For example, even though the functional glass of the present disclosure is used as a windshield, the glass plate is not particularly limited in the case where the functional glass has transparency wherein the scene ahead can be fully confirmed visually. It is preferable that the refractive index of the glass plate be 1.2 or more and 2.0 or less, and it is more preferable that the refractive index be 1.4 or more and 1.8 or less. As long as the thickness, shape, and the like of the glass plate do not affect the reflection of display light, they are not particularly limited and can be suitably designed depending on the use. A reflection increasing film including a multilayer film, and a metal thin film layer having a heat shielding function may be also provided on the reflective surface on the glass plate. These films can improve the reflectance of incident polarized light. For example, when the functional glass of the present disclosure is used as a windshield for cars, it is preferable to adjust the reflectance so that the visible light transmittance of the functional glass is 70% or more.

An example of the method of manufacturing functional glass using the optical functional film or optical laminate of the present disclosure will be described specifically. First, two glass plates are provided. When the functional glass is used as laminated glass for a windshield for cars, soda-lime glass made by the floating method is used. The glass may be either transparent glass and green-colored glass, and is not particularly limited. As to the thickness of these glass plates, around 2 mmt is usually employed; however, glass plates having a thickness a little thinner than this can also be used in response to requests for the weight reduction of glass in recent years. Glass plates are cut out in a predetermined shape, and the glass edges are chamfered off and then washed. When a black print in a frame shape or a dot shape is required, this is printed on the glass plates. When a curved surface shape like a windshield is needed, the glass plates are heated at 650° C. or more and then faired by pressing with a mold, bending by self weight, or the like so that the two sheets may be in the same surface shape, and the glass is cooled. When the cooling rate is excessively increased at this time, stress distribution occurs in the glass plates, the glass plates become tempered glass, and the glass plates are therefore slowly cooled. One of these manufactured glass plates is placed horizontally, the optical functional film or optical laminate of the present disclosure is laid thereon and the other glass plate is placed. Subsequently, the optical functional film and the intermediate films protruded from the edges of the glass plates are cut and removed with a cutter. Then, heating is performed at a temperature of 80° C. to 100° C. while air existing between the glass plates and the optical functional film or optical laminate laminated like a sandwich is deaerated, and preliminary adhesion is performed. As methods for deaerating air, there are two types of the bag method, which is performed by wrapping the laminate of glass plate/optical functional film or optical laminate/glass plate in a rubber bag made of heat-resistant rubber or the like, and the ring method, in which sealing is performed by covering only the end portion of the glass plate with a rubber ring, and either may be used. After the completion of the preliminary adhesion, the laminate of glass plate/optical functional film or optical laminate/glass plate taken out of the rubber bag or the laminate from which the rubber ring is removed is placed in an autoclave, heated to 120° C. to 150° C. under a high pressure of 10 to 15 kg/cm², and subjected to heating and pressurization treatment for 20 minutes to 40 minutes under these conditions. After the treatment, the laminate is cooled to 50° C. or less and then decompressed. Functional glass of the present disclosure including glass plate/optical functional film or optical laminate/glass plate is taken out of the autoclave.

The thus obtained functional glass can be used as windshields, side glasses, rear glasses, and roof glasses for standard-sized cars, small cars, light cars, and the like as well as a large-sized special cars and small special cars. Moreover, the functional glass can be used as windows for railcars, vessels, airplanes and as window materials for building materials and industrial uses. According to the form of use, the functional glass can be used with the functional glass laminated onto or bonded onto members having a UV-blocking or a light control function.

<Head-Up Display System>

Figure 4:
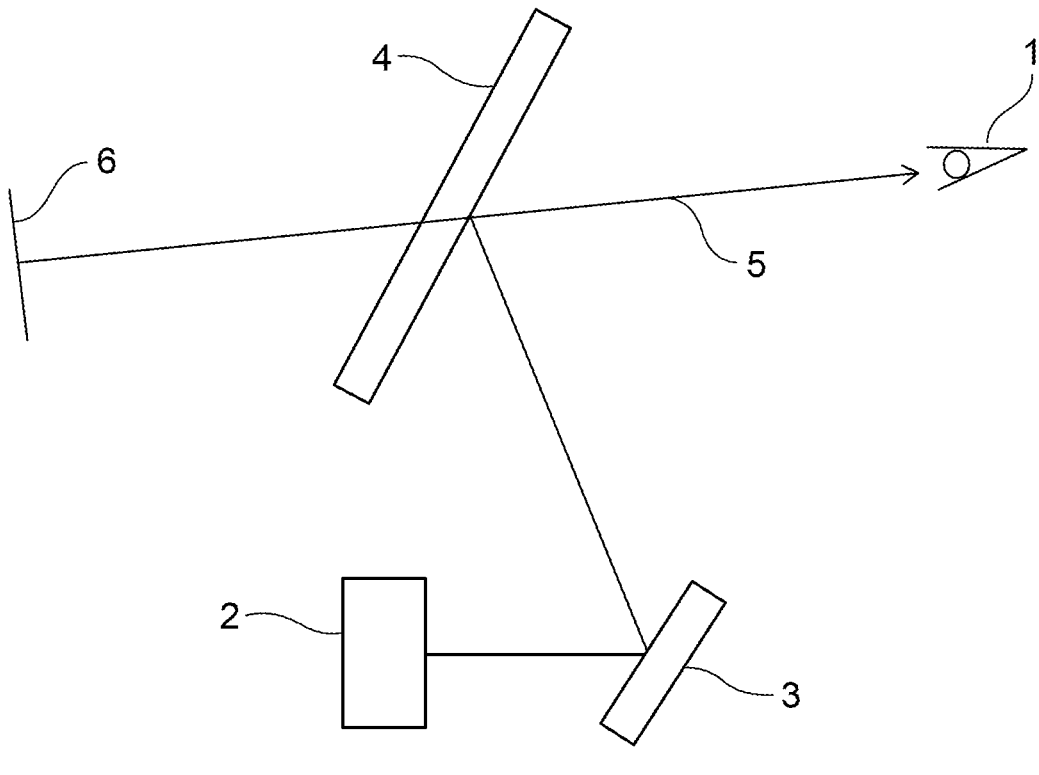
FIG. 4 is a schematic view showing one embodiment of a head-up display system according to the present disclosure.

FIG. 4 schematically shows one embodiment of the HUD system of the present disclosure. The HUD system shown in FIG. 4 includes a display image projection unit (display) 2 which converts display light that shows a display image into S polarized light or P polarized light and emits the S polarized light or P polarized light, a reflecting mirror 3 which reflects the display light emitted from the display image projection unit 2, and functional glass 4 of the present disclosure on which the S polarized light or P polarized light emitted from the display image projection unit 2 is incident. The S polarized light or the P polarized light reaches an observer 1 through an optical path 5 by reflecting the S polarized light or the P polarized light emitted from the display image projection unit 2 on the reflecting mirror 3 and irradiating the functional glass 4 which functions as a windshield with this reflected display light, and a virtual image 6 of the display image can be visually confirmed. Although, in the HUD system shown in FIG. 4, the display light emitted from the display image projection unit 2 comes into the functional glass 4 through the reflecting mirror 3, the display light may come into the functional glass 4 directly from the display image projection unit 2. The display light that shows a display image may be emitted from the display image projection unit 2 as random light, reflected on the reflecting mirror 3, and passed through a polarization plate before this reflected light reaches the functional glass 4, and thereby the functional glass 4 may be irradiated with desired polarized light adjusted from the polarized light emitted from the display image projection unit 2. Furthermore, although the HUD system shown in FIG. 4 includes the functional glass as a display medium, the HUD system may include the optical functional film or optical laminate of the present disclosure as a display medium.

When the ½ wavelength plate is used as the phase difference layer and the incident light is S polarized light, some of light coming into the functional glass 4 at a Brewster angle is reflected on a surface of the functional glass 4 as it is, and confirmed visually by an observer 1. Meanwhile, incident light passing through the functional glass 4 is converted into P polarized light with the ½ wavelength plate inside the functional glass 4. Thereafter, light emitted from the functional glass 4 to air makes a Brewster angle, and therefore reflection of the P polarized light is suppressed to hardly cause a ghost phenomenon. When the incident light is P polarized light, making the incident light come into the functional glass 4 at a Brewster angle suppresses reflection of the glass surface to hardly cause a ghost phenomenon. Meanwhile, the incident light passing through the functional glass 4 is converted into S polarized light with the ½ wavelength plate inside the functional glass 4. Thereafter, the light emitted from the functional glass 4 to air is reflected as it is, and confirmed visually by an observer 1. As described above, use of the head-up display system in the form of the present disclosure can suppress formation of a ghost phenomenon regardless of types of the polarized light, and can provide a head-up display with excellent visibility.

<Display Image Projection Unit>

Figure 5:
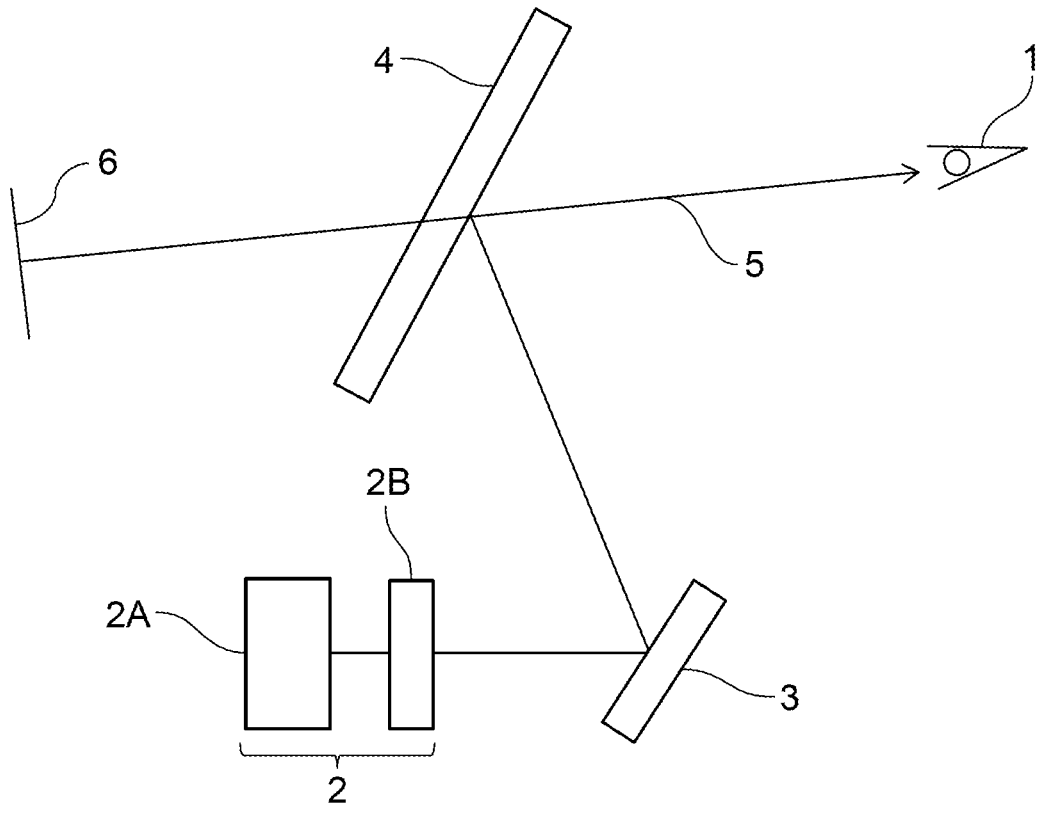
FIG. 5 is a schematic view showing another embodiment of a head-up display system according to the present disclosure.

As long as the display image projection unit 2 can emit desired P polarized light or S polarized light until it finally reaches the functional glass 4, the display 2 is not particularly limited. The examples include liquid crystal displays (LCDs) and organic EL displays (OLEDs). When the display image projection unit 2 is a liquid crystal display, emission light is usually linear polarized light, and can therefore be used as it is. Meanwhile, when the display image projection unit 2 is an organic EL display, for example, as shown in FIG. 5, the display image projection unit 2 may include a light source 2A and a polarizing plate 2B which can emit P polarized light or S polarized light. When the HUD system is used for a car, optical members such as a polarizing plate and a ½ wavelength plate are disposed on a light-emitting opening such as a dashboard, and the liquid crystal display and the organic EL display can also be adjusted so that P polarized light or S polarized light can be emitted from the display image projection unit 2. The light source used for the display image projection unit 2 is not particularly limited, and the light source such as a laser light source, an LED source, or the like can be used. The display image can be clarified more effectively by setting the central reflection wavelength of a phase difference element forming the phase difference layer so that the central reflection wavelength corresponds to the emission spectrum of the above-mentioned light source.

<Reflecting Mirror>

The HUD system of the present disclosure may include a reflecting mirror 3 if needed. As long as the reflecting mirror 3 can reflect display light from the display image projection unit 2 toward the functional glass 4, the reflecting mirror 3 is not particularly limited. For example, the reflecting mirror 3 includes a plane mirror, a concave mirror, or the like. When a concave mirror is used as the reflecting mirror 3, the concave mirror can also magnify the display light from the display at a predetermined magnifying power.

In the HUD system according to the present disclosure, when the Brewster angle of the S polarized light or the P polarized light to the functional glass 4 is defined as α, it is preferable that the incidence angle at which light emitted from the display image projection unit 2 comes into functional glass 4 as the display medium be in the range of α-10° to α+10°. It is more preferable that the incidence angle be in the range of α-5° to α+5°. The incidence angle means an angle which an axis perpendicular to the surface of the display medium (functional glass 4) and the light coming into the surface of the display medium form (hereinafter, this incidence angle is referred to as "incidence angle X").

In one embodiment of the HUD system of the present disclosure, when the ½ wavelength plate is used as the optical functional film, when the display medium is the functional glass 4, and when the display light emitted from the display image projection unit 2 is S polarized light, reflection of P polarized light converted with the functional glass 4 on a glass plate on the outside of the car can be suppressed to suppress formation of a double image by making the S polarized light emitted from the display image projection unit 2 via the reflecting mirror 3 come at an incidence angle within the range of α-10° to α+10°, that is, the neighborhood of a Brewster angle to the axis perpendicular to the surface of the functional glass 4, preferably the Brewster angle α. That is, when the incidence angle of the S polarized light is less than α-10° or more than α+10°, the incidence angle of the S polarized light is out of the neighborhood of the Brewster angle, the reflection of the P polarized light converted with the ½ wavelength plate may increase, and a double image may be formed.

In the HUD system of the present disclosure, it is preferable that the light emitted from the display image projection unit come from a side on which a phase difference layer having the highest refractive index among (A) the two or more phase difference layers is disposed. When the light emitted from the display image projection unit is S polarized light, the angle of view increases, and thus a viewer can use the HUD system within a wide region of the angle of view without stress.

In another embodiment of the HUD system of the present disclosure, it is preferable that a laminate in which one or two or more circularly polarized light reflecting layers (cholesteric liquid crystal layers) as the phase difference layer are sandwiched by two ¼ wavelength plates be used, the display medium be the functional glass, and the display light emitted from the display image projection unit 2 be P polarized light. Since reflected light from the road surface is generally S polarized light, polarization sunglasses are designed to absorb S polarized light. Therefore, in a conventional HUD system using S polarized light, the visibility of the display image in the HUD through polarization sunglasses decreases extremely. Meanwhile, in the case of the HUD system in which P polarized light reaches the observer and which uses P polarized light, the formation of a double image can be suppressed, and the visibility of the display image can be enhanced also when the polarization sunglasses are worn. Moreover, when the circularly polarized light reflecting layer is the cholesteric liquid crystal layer, the circularly polarized light passing through the circularly polarized light reflecting layer is converted to the original P polarized light with a second ¼ wavelength plate with a slow axis disposed with positional relationship perpendicular to a slow axis of a first ¼ wavelength plate. The converted P polarized light also comes into the glass surface of the outside of the car on the outside of the second ¼ wavelength plate at an angle in the neighborhood of the Brewster angle. Therefore, reflection of the P polarized light on the glass surface of the outside of the car of the outside of the second ¼ wavelength plate can be remarkably reduced, and as a result, formation of a double image is remarkably improved.

In the HUD system of the present disclosure, when the functional glass including the optical functional film having the ½ wavelength plate is provided for example, it is preferable that an angle θ which: a polarized light axis of S polarized light or a polarized light axis of P polarized light which comes from a position inclined at 45° or more and 65° or less from an axis perpendicular to the surface of the functional glass; and a slow axis of the optical functional film form be controlled to 35° or more and 47° or less to effectively perform the polarization conversion (for example, P polarized light is converted to S polarized light, or S polarized light is converted to P polarized light). By setting the incidence angle of the S polarized light or the P polarized light coming into the functional glass within the range of 45° or more and 65° or less, when the P polarized light comes into the functional glass, the reflectance on the surface of the functional glass can be suppressed to theoretically 2% or less. Transmitted P polarized light is converted into S polarized light with the ½ wavelength plate, and the converted S polarized light is reflected on the interface between the functional glass on the side opposite to the incidence side and air. The reflected S polarized light is converted into P polarized light with the ½ wavelength plate again, and this P polarized light reaches an observer. When S polarized light comes into the functional glass, the S polarized light is reflected on the surface of the functional glass, and this S polarized light reaches the observer. Some of the transmitted S polarized light is converted into P polarized light with the ½ wavelength plate, the converted P polarized light is not reflected on the functional glass on the side opposite to the incidence side or the interface between the functional glass and air, and passes. Thus, the formation of a double image can be suppressed by controlling the incidence angle X of S polarized light or P polarized light which comes into the functional glass. When the angle θ is less than 35° or more than 47°, the polarization axis conversion performance for converting P polarized light which comes into the functional glass into S polarized light or converting S polarized light into P polarized light which comes into the functional glass is low, and consequently a double image may be formed. The ½ wavelength plate exhibits good polarization axis conversion performance by controlling this angle θ appropriately, and the display image can be consequently visually confirmed more clearly.

It is preferable that the angle θ be a value calculated from the following Expressions (2) and (3) to appropriately control the polarization axis conversion performance when the optical functional film has the ½ wavelength plate. Here, the technical meaning of the following Expressions (2) and (3) will be described. When S polarized light or P polarized light which comes into the functional glass including such an optical functional film passes the ½ wavelength plate, which is a medium having a refractive index different from air, the incidence angle X at which the S polarized light or the P polarized light comes into the ½ wavelength plate changes. Here, when the incidence angle X which S polarized light or P polarized light forms with the functional glass is defined as α, the incidence angle X at which the S polarized light or the P polarized light actually comes into the ½ wavelength plate, namely the refractive angle of the ½ wavelength plate is defined as β, the refractive index of air is defined as $n_\alpha$, and the refractive index of the ½ wavelength plate is defined as $n_{62}$, sin α/sin β=$n_{62}$/$n_\alpha$ is valid according to Snell's law. When this expression is simplified to an equation in which 62 is found, Expression (3) is derived. Meanwhile, if a phase difference value when the polarization axis of S polarized light which comes into the functional glass is defined as the x-axis, the polarization axis of P polarized light is defined as the y-axis, and an angle which the y-axis and the slow axis of the ½ wavelength plate form is defined as θ is Re, the y-axis is represented by Re• cos θ, and the x-axis is represented by Re• sin θ using vector analysis. Here, since it is known that the polarization axis conversion performance of the ½ wavelength plate is maximum when light comes in at 45° to the slow axis of the ½ wavelength plate, it is desirable that, theoretically, the angle θ formed between the polarization axis of the S polarized light or the polarization axis of the P polarized light and the slow axis of the optical functional film be 45°. However, as mentioned above, even though the angle formed between a polarization axis of S polarized light or a polarization axis of P polarized light which comes into the functional glass and the slow axis of the optical functional film is defined as θ, the angle at which the S polarized light or the P polarized light comes into the ½ polarizing plate is actually β. Then, when, as to the y-axis (theoretical y-axis) which is Re• cos θ, the y-axis inclined at an angle of β around the x-axis (actual y-axis) is found, Re• cos θ/actual y-axis=sin (90°-β) is valid, and the actual y-axis is represented by Re• cos θ cos β. As mentioned above, it is desirable that the angle which the slow axis of the ½ wavelength plate and the polarization axis of the S polarized light or the polarization axis of the P polarized light form be 45°. The x-axis (Re• sin θ) needs to be equal to the actual y-axis (Re• cos θ cos β ) to adjust an angle which the polarization axis of the S polarized light or the P polarized light which comes into the functional glass and the slow axis of the ½ wavelength plate form to 45°. Therefore, Re• sin θ=Re• cos θ cos β is found, and Expression (2) is derived by simplifying this expression. Thus, the polarization axis conversion performance which the ½ wavelength plate exhibits can be utilized to the utmost by controlling the angle θ strictly using the relationship with the angle β at which the S polarized light or the P polarized light actually comes into the ½ polarizing plate based on a value calculated from the following Expressions (2) and (3).

[Expression 2]

$$\tan \theta = \cos \beta \tag{2}$$

$$\beta = \sin^{-1}\left(\sin \alpha \cdot \frac{n_\alpha}{n_\beta}\right) \tag{3}$$

θ: Angle which the slow axis of the ½ wavelength plate and the polarization axis of S polarized light or P polarized light which comes into the functional glass at any incidence angle α form α: Incidence angle of S polarized light or P polarized light which comes into the functional glass $n_\alpha$: Refractive index of air $n_\beta$: Refractive index of the ½ wavelength plate It is preferable that the range of the angle θ be controlled to the range of the value of the angle θ±5°, and it is more preferable that the range of the angle θ be controlled to the range of the value of the angle θ±3°. When the angle θ is out of the range of an angle which satisfies a value calculated from Expressions (2) and (3) ±5°, the efficiency in converting the polarization light which the ½ wavelength plate exhibits decreases. A decrease in the efficiency in converting the polarization light with the ½ wavelength plate can be suppressed by controlling the range of the angle θ based on the value calculated from Expressions (2) and (3).

As the refractive index of the ½ wavelength plate substituted for Expression (3), the refractive index in the direction of the slow axis of the ½ wavelength plate is defined as nx, the refractive index in the direction at right angles to the direction of the slow axis in the plane of the ½ wavelength plate is defined as ny, the refractive index in the thickness direction of the ½ wavelength plate is defined as nz, and a value obtained by averaging the sum of these is used as an average refractive index. When a ½ wavelength plate which is a commercial item is used, a value listed on a catalog or the like can also be used as the average refractive index. When the polymerizable liquid crystal described below is used as a material of the ½ wavelength plate, the average refractive index is represented by (nx+ny+nz)/3=(no+no+ne)/3 using the original ordinary refractive index no and the extraordinary refractive index ne. If specific examples of θ calculated from Expressions (2) and (3) are given, when the refractive index of air is defined as 1.00, a ½ wavelength plate having a refractive index of 1.55 is used, and the incidence angle X of S polarized light or P polarized light is 45°, for example, the value of θ is 42° based on Expressions (2) and (3). Therefore, the range of θ is preferably 37° or more and 47° or less, and more preferably 39° or more and 45° or less. When the incidence angle X of S polarized light or P polarized light is 50°, the value of θ is 41° based on Expressions (2) and (3). Therefore, the range of 0 is preferably 36° or more and 46° or less, and more preferably 38° or more and 44° or less. When the incidence angle X of S polarized light or P polarized light is 56° or 60°, the value of θ is 40° based on Expressions (2) and (3). Therefore, the range of θ be 35° or more and 45° or less, and it is more preferable that the range be 37° or more and 43° or less. Furthermore, when the incidence angle X of S polarized light or P polarized light is 65°, the value of θ is 39° based on Expressions (2) and (3). Therefore, the range of 0 is preferably 34° or more and 44° or less, and more preferably 36° or more and 42° or less.

As mentioned above, in the present disclosure, the polarization axis conversion performance which the ½ wavelength plate exhibits can be further enhanced by controlling the angle θ which the polarization axis of S polarized light or P polarized light which comes into the optical functional film and the slow axis of the ½ wavelength plate form. In such a case, it is particularly preferable to use a ½ wavelength plate including a polymerizable liquid crystal layer as a layer having the action of converting a polarization axis from the viewpoints of the controllability of the slow axis of the ½ wavelength plate and manufacturing cost. As long as the ½ wavelength plate is suitable for use of a head-up display, wavelength dispersibility of such a ½ wavelength plate is not particularly limited. It is desirable to have reverse wavelength dispersibility to accurately convert polarized light within a wide wavelength range of the visible light region. A polymer generally exhibits normal dispersion in which an absolute value of a birefringence index increases on a short wavelength side, but the reverse wavelength dispersibility can be obtained with a liquid crystal compound such that a birefringence increases on a long wavelength side by controlling a value of birefringence Δn on each wavelength of the visible light. The reverse wavelength dispersibility can also be obtained by laminating a combination of appropriate slow axes of a plurality of phase difference plates having phase difference values appropriate for the wavelength dispersion characteristics of a compound. When such a ½ wavelength plate in which a plurality of the phase difference plates are laminated is used, the ½ wavelength plate exhibits good polarization axis conversion performance by appropriately controlling, as above, the angle θ which the polarization axis of the S polarized light or P polarized light which are incident on the optical functional film and the slow axis of the ½ wavelength plate form on the slow axis angle of each phase difference plate. As a result, the display image can be further clearly confirmed visually.

EXAMPLES

Hereinafter, the present disclosure will be described in detail with Examples. In the Examples, "part" means part by mass. As long as the present disclosure does not exceed the gist, the present disclosure is not limited to the following Examples. Unless otherwise mentioned, room temperature is within a range of 20° C.±5° C.

Example 1

Preparation of Coating Liquid (Adhesive)

Components shown as A to I were mixed to prepare coating liquids (adhesives 1 to 9) having composition ratios shown in Table 1. With the prepared adhesives 1 to 9, a refractive index before curing of each adhesive was measured by using a digital refractometer ("RX-7000α", manufactured by ATAGO CO., LTD.). Furthermore, a viscosity of each adhesive was measured by using a viscosimeter ("TVE-22L", manufactured by Toki Sangyo Co., Ltd.). Amounts of the components in Table 1 are on parts by mass.

TABLE 1

| Component | Adhesive 1 | Adhesive 2 | Adhesive 3 | Adhesive 4 | Adhesive 5 | Adhesive 6 | Adhesive 7 | Adhesive 8 | Adhesive 9 |
|---|---|---|---|---|---|---|---|---|---|
| A | 25.0 | 25.0 | 19.2 | 26.9 | 23.1 | 21.2 | 17.3 | 13.5 | 16.0 |
| B | 38.5 | 38.5 | 38.5 | 41.4 | 41.4 | 41.4 | 38.5 | 38.5 | |
| C | 22.1 | 32.7 | 32.7 | | 3.9 | 3.9 | | | 8.0 |
| D | 10.6 | | | 21.2 | 21.2 | 23.1 | | | 16.0 |
| E | 3.8 | 3.8 | 3.8 | 3.9 | 3.8 | 3.8 | 3.8 | 3.8 | 4.0 |
| F | | | | | | | 19.2 | 21.2 | 24.0 |
| G | | | 5.8 | | | | | | 32.0 |
| H | | | | 6.7 | 6.7 | 6.7 | 21.2 | | |
| I | | | | | | | | 23.3 | |
| Refractive Index before curing | 1.5402 | 1.5419 | 1.5434 | 1.5395 | 1.5395 | 1.5414 | 1.5322 | 1.5255 | 1.4989 |
| Viscosity [mPa · s] | 193.5 | 218.1 | 380.9 | 196.6 | 166.8 | 188.1 | 745.4 | 543.3 | 201.0 |

A: 4-Hydroxybutyl acrylate (4-HBA, produced by OSAKA ORGANIC CHEMICAL INDUSTRY LTD.)
B: Orthophenylphenoxyethyl acrylate (Miramer M1142, produced by Miwon Specialty Chemical Co., Ltd.)
C: Bisphenol A type epoxy acrylate (KAYARAD$^{RTM}$ R-115F, produced by Nippon Kayaku Co., Ltd.)
D: Bisphenol F type epoxy acrylate (KAYARAD$^{RTM}$ R-381, produced by Nippon Kayaku Co., Ltd.)
E: 2,4,6-Trimethylbenzoyldiphenylphosphine oxide (Omnirad$^{RTM}$ TPO-H, produced by IGM Resin B.V.)
F: Urethane acrylate (UX-0937, produced by Nippon Kayaku Co., Ltd.)
G: EO-modified phenol acrylate (PHE-2, produced by DKS Co. Ltd.)
H: Bisphenol A type epoxy acrylate (VISCOAT 700HV, produced by OSAKA ORGANIC CHEMICAL INDUSTRY LTD.)
I: Dicyclopentenyloxyethyl acrylate (FA512-AS, produced by Showa Denko Materials Co., Ltd.)

<Measurement of Refractive Index of Adhesive Cured Film>

The adhesives 1 to 9 were applied to triacetylcellulose (TAC) films (P960, produced by Tac Bright, thickness: 60 μm) as supporting substrates, UV irradiation was performed with a high-pressure mercury lamp (manufactured by HARISON TOSHIBA LIGHTING CORPORATION) at a generating power of 120 W for 5 to 10 seconds, and fixing was performed to produce adhesive cured films 1 to 9 on the supporting substrates. Subsequently, with the adhesive cured films 1 to 9, a perpendicular reflectance of the adhesive layer when polarized light at 400 nm to 700 nm was incident was measured by using a spectrophotometer (UV-3600 manufactured by SHIMADZU CORPORATION), and a refractive index n of the adhesive layer was calculated from an averaged value thereof R₁ with the following Expression (4). A refractive index N of the supporting substrate (substrate material) was 1.487. The results are shown in Table 2.

<Measurement of Elastic Modulus of Adhesive Cured Film>

The adhesives 1 to 9 were applied to aluminum substrates, polyester films, COSMOSHINE® A4100, produced by TOYOBO CO., LTD., was laid and pressed thereon, UV irradiation was performed with a high-pressure mercury lamp (manufactured by HARISON TOSHIBA LIGHTING CORPORATION) at a generating power of 120 W for 5 to 10 seconds, and fixing was performed to produce adhesive cured films 1 to 9 with 140 to 160 μm in thickness on the aluminum substrates. Subsequently, the adhesive cured film was cut to 1 cm in width and 4 cm in length, and a tensile test was performed by using TENSILON Universal Tester ("RTG-1210", manufactured by A&D Company, Limited.) under conditions of a tensile rate of 100 mm/min at 25° C. and 140° C. to measure elastic moduli. The results are shown in Table 2.

TABLE 2

| | Average reflectance [%] | Refractive index n | Elastic modulus [MPa] |
|---|---|---|---|
| Adhesive cured film 1 | 6.205 | 1.573 | 1649.1 |
| Adhesive cured film 2 | 6.245 | 1.574 | 1834.7 |
| Adhesive cured film 3 | 6.217 | 1.573 | 967.6 |
| Adhesive cured film 4 | 6.534 | 1.584 | 185.6 |

TABLE 2-continued

| | Average reflectance [%] | Refractive index n | Elastic modulus [MPa] |
|---|---|---|---|
| Adhesive cured film 5 | 6.508 | 1.583 | 360.4 |
| Adhesive cured film 6 | 6.436 | 1.580 | 496.5 |
| Adhesive cured film 7 | 5.793 | 1.559 | 238.2 |
| Adhesive cured film 8 | 5.830 | 1.560 | 20.9 |
| Adhesive cured film 9 | 5.492 | 1.548 | 21.2 |

[Expression 3]
$$R_1 = \{(N - n^2)/(N + n^2)\}^2 \ldots (4)$$
R₁: Average reflectance
N: Refractive index of supporting substrate
n: Refractive index of adhesive layer <Manufacturing of Phase Difference Layer>

Preparation of Coating Liquid (Liquid Crystal Composition)

First, a coating liquid (R1) having a composition shown in Table 3 was prepared. Amounts of the components shown in Table 3 are on parts by mass.

TABLE 3

| Type | Name of material | Content |
|---|---|---|
| Polymerizable liquid crystal monomer | Paliocolor LC-242 (produced by BASF SE) | 23.8 |
| Solvent | Toluene | 35.7 |
| Solvent | Methyl isobutyl ketone | 35.7 |
| Polymerization initiator | Irgacure 907 (produced by BASF SE) | 4.8 |

Three ½ wavelength plates were manufactured by using the prepared coating liquid R1 by the following procedure. As a supporting substrate, a TAC film (P960, produced by Tac Bright, thickness: 60 μm) subjected to a rubbing treatment by a method described in Example 1 in Japanese Patent Application Publication No. 2002-90743 was used. The rubbing angle was set so that, as shown in Table 4, angles which a longitudinal direction of the film and a slow axis of the ½ wavelength plates formed (hereinafter, also referred to as "slow axis angle") were 71.5°, 50°, and 26.5°, respectively. First, the coating liquid R1 was applied to the rubbing-treated surface of the TAC film at room temperature by using a wire bar so that a thickness of a ½ wavelength plate obtained after drying was approximately 2 μm. The obtained coating film was heated at 50° C. for 2 minutes to remove the solvent, and a liquid crystal phase was formed. Subsequently, on the liquid crystal layer, UV irradiation was performed with a high-pressure mercury lamp (manufactured by HARISON TOSHIBA LIGHTING CORPORATION) at a generating power of 120 W for 5 to 10 seconds, and fixing was performed to produce phase difference layers 1 to 3 having the phase difference layer on the supporting substrate. A phase difference value of each region of the obtained phase difference layers 1 to 3 was measured with an automatic birefringence meter ("KOBRA-21ADH", manufactured by Oji Scientific Instruments Co., Ltd.), and as a result, a phase difference value at 586 nm was 293 nm, 230 nm, and 275 nm, respectively. Subsequently, with the phase difference layers 1 to 3, a perpendicular reflectance of the phase difference layers 1 to 3 when polarized light at 400 nm to 700 nm was incident was measured by using a spectrophotometer (UV-3600 manufactured by SHIMADZU CORPORATION), and an average value $R_2$ was calculated. Thereafter, a refractive index $n_2$ in a direction of a fast axis of the phase difference layer was calculated with the following Expressions (5), (6), (7), and (8) to satisfy a relationship between reflectance $r_1$, $r_2$, and $r_3$ on interfaces of each layer and the average reflectance R of an entirety of the layer. $\theta_1$, which was an incidence angle from air into the phase difference layer, was 5°, $\theta_2$ was a refractive angle when light came from air into the phase difference layer, namely an incidence angle when light came from the phase difference layer into the oriented film, $\theta_3$ was a refractive angle when light came from the phase difference layer into the oriented film, namely an incidence angle when light came from the oriented film into the supporting substrate, and $\theta_4$ was a refractive angle when light came from the oriented film into the supporting substrate, which were calculated with the following Expressions (9), (10), and (11). From the reflectance $r_1$, $r_2$, and $r_3$ on the interfaces of each layer, the refractive index $n_1$ of air was 1.000, the refractive index $n_3$ of the oriented film was 1.531, and the refractive index $n_4$ of the supporting substrate was 1.487. The results are shown in Table 4.

[Expression 4]

$$\text{Average reflectance } R_2 = r_1 - r_2 + r_3 \tag{5}$$

$r_1$: Reflectance when light comes from air into phase difference layer $r_2$: Reflectance when light comes from phase difference layer into oriented film $r_3$: Reflectance when light comes from oriented film into supporting substrate

[Expression 5]

$$r_1 = \tan^2(\theta_1 - \theta_2)/\tan^2(\theta_1 + \theta_2) \tag{6}$$

$$r_2 = \tan^2(\theta_2 - \theta_3)/\tan^2(\theta_2 + \theta_3) \tag{7}$$

$$r_3 = \tan^2(\theta_3 - \theta_4)/\tan^2(\theta_3 + \theta_4) \tag{8}$$

$\theta_1$: Incidence angle when light comes from air into phase difference layer (5°

$\theta_2$: Refractive angle when light comes from air into phase difference layer=Incidence angle when light comes from phase difference layer into oriented film $\theta_3$: Refractive angle when light comes from phase difference layer into oriented film=Incidence angle when light comes from oriented film into supporting substrate $\theta_4$: Refractive angle when light comes from oriented film into supporting substrate

[Expression 6]

$$\theta_2 = \sin^{-1}\left(\sin\theta_1 \cdot \frac{n_1}{n_2}\right) \tag{9}$$

$$\theta_3 = \sin^{-1}\left(\sin\theta_2 \cdot \frac{n_2}{n_3}\right) \tag{10}$$

$$\theta_4 = \sin^{-1}\left(\sin\theta_3 \cdot \frac{n_3}{n_4}\right) \tag{11}$$

$n_1$: Refractive index of air $n_2$: Refractive index of phase difference layer in a direction of a fast axis $n_3$: Refractive index of oriented film $n_4$: Refractive index of supporting substrate

TABLE 4

| | Slow axis angle | Phase difference value [nm] | Average reflectance [%] | Refractive index n |
|---|---|---|---|---|
| Phase difference layer 1 | 71.5° | 293 | 5.521 | 1.612 |
| Phase difference layer 2 | 26.5° | 230 | 5.514 | 1.611 |
| Phase difference layer 3 | 50.0° | 275 | 5.417 | 1.605 |

<Manufacturing of Optical Functional Film>

The adhesive 1 was applied to the phase difference layer 1 by using an automatic applying apparatus ("PI-1210", manufactured by TESTER SANGYO CO., LTD.), the phase difference layer 2 was disposed on the coated surface, and the phase difference layer 1 and the phase difference layer 2 were bonded by a laminator so that the phase difference layers adhered to each other. Subsequently, on the bonded laminate, UV irradiation was performed with a high-pressure mercury lamp (manufactured by HARISON TOSHIBA LIGHTING CORPORATION) at a generating power of 120 W for 5 to 10 seconds, and the adhesive 1 was cured to obtain a bonded film 1. Thereafter, the bonded film 1 was immersed for 5 minutes in a 2 mol/L aqueous solution of potassium hydroxide heated to 40° C., washed with water, and then dried at 70° C. for 5 minutes to manufacture an optical functional film 1.

<Manufacturing of Optical Laminate>

Two transparent intermediate films made of polyvinyl butyral, having a thickness of 0.38 mm, and containing triethylene glycol di-2-ethylhexanoate as a plasticizer were cut to the same size as the optical functional film 1. The optical functional film 1 was disposed between the intermediate films which were polyvinyl butyral films, and subsequently, the optical film and the two intermediate films were pressurized and press-fit with a laminator to obtain an optical laminate 1.

<Manufacturing of Functional Glass>

The optical laminate 1 was disposed between two glass plates each having the same size as the optical laminate 1 and a thickness of 2 mm, and pressurization and heating were subsequently performed to obtain functional glass A.

Specifically, the optical laminate 1 and the transparent glass plate were laid on the transparent glass plate sequentially. This was wrapped in a rubber bag, deaerated in an autoclave heated at 90° C. for 10 minutes, and subjected to preliminary adhesion. This was cooled to room temperature, then taken out of the rubber bag, and heated and pressurized in the autoclave at 135° C. under a high pressure of 12 kg/cm² for 30 minutes again. Functional glass A having good appearance in which the laminate for a laminated glass was inserted was thus manufactured.

<Evaluation of Orange Peel>

The evaluation of orange peel of the functional glass was performed in a room. The functional glass was placed on a desk, a fluorescent lamp was projected on a half-mirror part, and a reflected image was evaluated visually. The evaluation criteria were set as follows, and A or B was evaluated as excellent appearance. The results are shown in Table 5.

A: There is no distortion in the reflected image of the fluorescent lamp.

B: There is almost no distortion in the reflected image of the fluorescent lamp. The reflected image slightly sways when the viewpoint is transversely shifted.

C: The reflected image of the fluorescent lamp is dimly observed due to an effect of small wrinkles.

D: The reflected image of the fluorescent lamp is observed with distortion due to an effect of large wrinkles.

<Manufacturing of Head-Up Display and Evaluation of Display Image>

A head-up display was manufactured with disposition shown in FIG. 4. As a display image projection unit 2 and a reflecting mirror 3, a liquid crystal display panel that enabled to emit P polarized light toward functional glass 4 was provided, and the functional glass A manufactured above was disposed as the functional glass 4. In a darkroom, with adjusting a width direction of the phase difference layer 1 in the constitution of the functional glass A to a horizontal direction so that an incidence angle of the P polarized light from the display image projection unit 2 was a Brewster angle (approximately 56°) relative to the functional glass A, the functional glass A was provided so that the glass plate on a side of the phase difference layer 1 was the incidence surface. An image was projected from the display image projection unit 2 with such disposition, and the display image was brightly and clearly projected. At this time, the viewpoint where a display image was observed was shifted in a vertical direction, and a range where the display image was clearly projected was recorded as an angle of view. The results are shown in Table 5.

<Evaluation of Double Image Luminance Ratio: Evaluation of Polarized Light Conversion Performance of ½ Wavelength Plate>

A line image in a horizontal direction from an image projector (display image projection unit 2) was projected toward the functional glass A under conditions to emit S polarized light, a reflected image was photographed with a color luminance meter ("Prometric IC-PMI", manufactured by Konica Minolta, Inc.), and the display image was evaluated. Regarding three points of a position I with 5 cm from left, a position II with 30 cm from left, and a position III with 43 cm from left in 60 cm in width. The evaluation image at the position I was photographed from a point X vertically distanced with 142 cm from the glass surface with a starting point of the position I. The evaluation image at the position II was photographed from a position with the luminance meter inclined at 10° in right relative to a perpendicular line from the point X to the position I. The evaluation image at the position III was photographed from a position with the luminance mater inclined at 15° in right relative to the perpendicular line from the point X to the position I. By analysis of the photographed image at each position, a double image luminance ratio was calculated by dividing a reflecting luminance (main image) of a line image on an interface between air and the glass plate on a side of the image projector in the constitution of the functional glass A by a reflecting luminance (double image) of a line image on an interface between air and the glass plate on the back side of the image projector. The results are shown in Table 5. A lower double image luminance ratio shown in Table 5 causes the image projected to the functional glass to be more hardly confirmed visually as a double image, and the visibility of the image can be judged to be better.

<Evaluation of Band>

A perpendicular transmittance of the obtained functional glass A when polarized light at 380 nm to 780 nm was incident was measured by using a spectrophotometer (UV-3600 manufactured by SHIMADZU CORPORATION). The perpendicular transmittance refers to a transmittance when an absorbing axis of an absolute polarizer and a slow axis of the functional glass form the right angle. The measured transmittance was converted into an absorbance, and a half-width value of the absorbance of the functional glass A was calculated. The results are shown in Table 5. At this time, all transmittance at 600 nm to 500 nm being less than 1% was evaluated as broadband, and a region with 1% or more was evaluated as narrow band.

Example 2

An optical laminate 2 and functional glass B were manufactured in the same way as in Example 1 except that an adhesive 2 was used instead of the adhesive 1. By using the manufactured functional glass B, a band, an angle of view, a double image luminance ratio, and a degree of orange peel were evaluated in the same way as in Example 1. The results are shown in Table 5.

Example 3

An optical laminate 3 and functional glass C were manufactured in the same way as in Example 1 except that an adhesive 3 was used instead of the adhesive 1. By using the manufactured functional glass C, a band, an angle of view, a double image luminance ratio, and a degree of orange peel were evaluated in the same way as in Example 1. The results are shown in Table 5.

Example 4

An optical laminate 4 and functional glass D were manufactured in the same way as in Example 1 except that an adhesive 4 was used instead of the adhesive 1. By using the manufactured functional glass D, a band, an angle of view, a double image luminance ratio, and a degree of orange peel were evaluated in the same way as in Example 1. The results are shown in Table 5.

Example 5

An optical laminate 5 and functional glass E were manufactured in the same way as in Example 1 except that an adhesive 5 was used instead of the adhesive 1. By using the manufactured functional glass E, a band, an angle of view, a double image luminance ratio, and a degree of orange peel were evaluated in the same way as in Example 1. The results are shown in Table 5.

Example 6

An optical laminate 6 and functional glass F were manufactured in the same way as in Example 1 except that an adhesive 6 was used instead of the adhesive 1. By using the manufactured functional glass F, a band, an angle of view, a double image luminance ratio, and a degree of orange peel were evaluated in the same way as in Example 1. The results are shown in Table 5.

Example 7

An optical laminate 7 and functional glass G were manufactured in the same way as in Example 1 except that an adhesive 7 was used instead of the adhesive 1. By using the manufactured functional glass G, a band, an angle of view, a double image luminance ratio, and a degree of orange peel were evaluated in the same way as in Example 1. The results are shown in Table 5.

Example 8

An optical laminate 8 and functional glass H were manufactured in the same way as in Example 1 except that an adhesive 8 was used instead of the adhesive 1. By using the manufactured functional glass H, a band, an angle of view, a double image luminance ratio, and a degree of orange peel were evaluated in the same way as in Example 1. The results are shown in Table 5.

Example 9

An optical laminate 9 and functional glass I were manufactured in the same way as in Example 1 except that the incidence surface was changed from the phase difference layer 1 to the phase difference layer 2. By using the manufactured functional glass I, a band, an angle of view, a double image luminance ratio, and a degree of orange peel were evaluated in the same way. The results are shown in Table 5.

Comparative Example 1

An optical laminate 10 and functional glass J were manufactured in the same way as in Example 1 except that an adhesive 9 was used instead of the adhesive 1. By using the manufactured functional glass J, a band, an angle of view, a double image luminance ratio, and a degree of orange peel were evaluated in the same way as in Example 1. The results are shown in Table 5.

Comparative Example 2

An optical laminate 11 and functional glass K were manufactured in the same way as in Example 1 except that the phase difference layer 3 was used instead of the phase difference layer 1 and a TAC film having no phase difference layer was used instead of the phase difference layer 2. By using the manufactured functional glass K, a band, an angle of view, a double image luminance ratio, and a degree of orange peel were evaluated in the same way as in Example 1. The results are shown in Table 5.

TABLE 5

| Measurement sample | Example 1 | Example 2 | Example 3 | Example 4 | Example 5 | Example 6 | Example 7 | Example 8 | Example 9 | Comparative Example 1 | Comparative Example 2 |
|---|---|---|---|---|---|---|---|---|---|---|---|
| | Functional glass A | Functional glass B | Functional glass C | Functional glass D | Functional glass E | Functional glass F | Functional glass G | Functional glass H | Functional glass I | Functional glass J | Functional glass K |
| Phase difference value of phase difference layer 1 [nm] | 293 | 293 | 293 | 293 | 293 | 293 | 293 | 293 | 293 | 293 | — |
| Phase difference value of phase difference layer 2 [nm] | 230 | 230 | 230 | 230 | 230 | 230 | 230 | 230 | 230 | 230 | — |
| Phase difference value of phase difference layer 3 [nm] | — | — | — | — | — | — | — | — | — | — | 275 |
| Refractive index of phase difference layer 1 | 1.612 | 1.612 | 1.612 | 1.612 | 1.612 | 1.612 | 1.612 | 1.612 | 1.612 | 1.612 | — |
| Refractive index of phase difference layer 2 | 1.611 | 1.611 | 1.611 | 1.611 | 1.611 | 1.611 | 1.611 | 1.611 | 1.611 | 1.611 | — |
| Refractive index of phase difference layer 3 | — | — | — | — | — | — | — | — | — | — | 1.605 |
| Refractive index of adhesive layer | 1.573 | 1.574 | 1.573 | 1.584 | 1.583 | 1.580 | 1.559 | 1.560 | 1.573 | 1.548 | 1.573 |
| Difference between refractive index of adhesive layer and refractive index of phase difference layer 1 | 0.039 | 0.038 | 0.039 | 0.028 | 0.029 | 0.032 | 0.053 | 0.052 | 0.039 | 0.064 | — |
| Difference between refractive index of adhesive layer and refractive index of phase difference layer 2 | 0.038 | 0.037 | 0.038 | 0.027 | 0.028 | 0.031 | 0.052 | 0.051 | 0.038 | 0.063 | — |
| Difference between refractive index of adhesive layer and refractive index of phase difference layer 3 | — | — | — | — | — | — | — | — | — | — | 0.032 |
| Adhesive layer | Adhesive 1 | Adhesive 2 | Adhesive 3 | Adhesive 4 | Adhesive 5 | Adhesive 6 | Adhesive 7 | Adhesive 8 | Adhesive 1 | Adhesive 9 | Adhesive 1 |
| Elastic modulus of adhesive layer cured film at 25° C. [MPa] | 1649.1 | 1834.7 | 967.6 | 185.6 | 360.4 | 496.6 | 238.2 | 20.9 | 1649.1 | 21.2 | 1649.1 |
| Elastic modulus of adhesive layer cured film at 140° C. [MPa] | 18.83 | 13.07 | 13.53 | 16.33 | 16.37 | 15.60 | 13.7 | 14.7 | 8.63 | 9.70 | 8.63 |
| Difference between elastic moduli measured at 140° C. and measured at 25° C. [MPa] | 1630.47 | 1821.63 | 954.07 | 169.27 | 344.03 | 480.9 | 224.5 | 6.2 | 1640.47 | 11.5 | 1640.47 |
| Incidence layer | Phase difference layer 1 | Phase difference layer 1 | Phase difference layer 1 | Phase difference layer 1 | Phase difference layer 1 | Phase difference layer 1 | Phase difference layer 1 | Phase difference layer 1 | Phase difference layer 2 | Phase difference layer 1 | Phase difference layer 3 |
| Luminance ratio [%] | 2.5 | 2.5 | 2.5 | 2.0 | 2.0 | 2.0 | 3.0 | 3.0 | 2.5 | 5.0 | 2.5 |
| Angle of view [°] | Vertical 10 | Vertical 10 | Vertical 10 | Vertical 10 | Vertical 10 | Vertical 10 | Vertical 10 | Vertical 10 | Vertical 5 | Vertical 10 | Vertical 10 |
| Band (half width value) | Broad (304 nm) | Broad (309 nm) | Broad (301 nm) | Broad (282 nm) | Broad (300 nm) | Broad (294 nm) | Broad (305 nm) | Broad (296 nm) | Broad (305 nm) | Broad (288 nm) | Narrow (117 nm) |
| Orange peel evaluation | D | D | C | B | B | B | B | B | D | B | D |

From the results in Table 5, Examples 1 to 9 exhibited a low luminance ratio, suppressed formation of a double image, and broadband, and thereby an optical functional film for an HUD having excellent polarization-converting ability within a wide wavelength region was able to be obtained. In Examples 1 to 8, since the incidence surface of incident light was a side of the phase difference layer having a high refractive index, the angle of view was improved, and a viewer was able to use the HUD system within a wide region of the angle of view without stress. Furthermore, since difference between the elastic modulus at room temperature and the elastic modulus at high temperature of the adhesive layer was 500 MPa or less in the adhesive layer in Examples 4 to 8, formation of orange peel was suppressed, and windshield glass excellent in aesthetic appearance was able to be achieved.

Meanwhile, since difference between the refractive index of the adhesive layer and the refractive index of the phase difference layer in the direction of the fast axis was large in Comparative Example 1, the luminance ratio was high and formation of a double image was observed. Since Comparative Example 2 had only one phase difference layer, the band was narrow and an optical functional film for an HUD having excellent polarization-converting ability within a wide wavelength region was failed to be obtained.

INDUSTRIAL APPLICABILITY

The optical functional film of the present disclosure has excellent polarization-converting ability within a wide wavelength region. Thus, a head-up display system including such an optical functional film eliminates unevenness of formation of a double image due to a projecting position, and the formation of a double image can be suppressed independently on the photographing position. Therefore, a viewer can use the head-up display system without stress.

What is claimed is:

1. An optical functional film for a head-up display, comprising (A) two or more phase difference layers and (B) an adhesive layer, wherein all of (A) the two or more phase difference layers are ½ wavelength plates;

(B) the adhesive layer is provided adjacent to the two or more phase difference layers; and an absolute value of difference between a refractive index of the adhesive layer and a refractive index of the phase difference layers adjacent to the adhesive layer in a direction of a fast axis is less than.

2. The optical functional film for a head-up display according to claim 1, wherein absolute values of differences between the refractive index of the adhesive layer and refractive indices of the two or more phase difference layers in the direction of the fast axis are both less than 0.060.

3. The optical functional film for a head-up display according to claim 1, wherein in (B) the adhesive layer, a difference between an elastic modulus at 25° C. and an elastic modulus at 140° C. is 500 MPa or less.

4. The optical functional film for a head-up display according to claim 1, wherein (B) the adhesive layer is a cured film obtained by curing a curable compound.

5. The optical functional film for a head-up display according to claim 4, wherein the curable compound is a photocurable compound.

6. An optical laminate for a head-up display, wherein (C) an intermediate film is further laminated on the optical functional film for a head-up display according to claim 1.

7. Functional glass for a head-up display, comprising: the optical functional film for a head-up display according to claim 1.

8. Functional glass for a head-up display, comprising: t the optical laminate for a head-up display according to claim 6; and (D) a glass plate.

9. A head-up display system, comprising, as a display medium, the optical functional film according to claim 1, and an optical laminate wherein (C) an intermediate film is further laminated on the optical functional film, or a functional glass for the head-up display.

10. A head-up display system, comprising, as a display medium, the optical laminate for a head-up display according to claim 6.

11. A head-up display system, comprising, as a display medium, the functional glass for a head-up display according to claim 7.

12. The head-up display system according to claim 9, wherein light emitted from a display image projection unit comes from a side on which a phase difference layer having a highest refractive index among (A) the two or more phase difference layers is disposed.

13. The head-up display system according to claim 9, wherein light emitted from a display image projection unit is S polarized light.

* * * * *